(12) United States Patent
Donahue et al.

(10) Patent No.: US 12,288,547 B2
(45) Date of Patent: Apr. 29, 2025

(54) GENERATING AUDIO DATA USING UNALIGNED TEXT INPUTS WITH AN ADVERSARIAL NETWORK

(71) Applicant: DeepMind Technologies Limited, London (GB)

(72) Inventors: Jeffrey Donahue, London (GB); Karen Simonyan, London (GB); Sander Etienne Lea Dieleman, London (GB); Mikolaj Binkowski, Amsterdam (NL); Erich Konrad Elsen, San Francisco, CA (US)

(73) Assignee: DeepMind Technologies Limited, London (GB)

( * ) Notice: Subject to any disclaimer, the term of this patent is extended or adjusted under 35 U.S.C. 154(b) by 400 days.

(21) Appl. No.: 17/339,834

(22) Filed: Jun. 4, 2021

(65) Prior Publication Data

US 2021/0383789 A1 Dec. 9, 2021

Related U.S. Application Data

(60) Provisional application No. 63/035,519, filed on Jun. 5, 2020.

(51) Int. Cl.
G10L 13/047 (2013.01)
G06N 3/04 (2023.01)
G06N 3/08 (2023.01)

(52) U.S. Cl.
CPC ............. *G10L 13/047* (2013.01); *G06N 3/04* (2013.01); *G06N 3/08* (2013.01)

(58) Field of Classification Search
CPC . G10L 13/047; G10L 25/30; G10L 2013/105; G10L 13/02; G06N 3/04; G06N 3/08; G06N 3/045; G06N 3/048; G06N 3/088
USPC .......................................................... 704/9
See application file for complete search history.

(56) References Cited

U.S. PATENT DOCUMENTS

| | | | | |
|---|---|---|---|---|
| 10,347,238 | B2 * | 7/2019 | Jin | G10L 13/08 |
| 11,017,761 | B2 * | 5/2021 | Peng | G10L 25/30 |
| 11,295,721 | B2 * | 4/2022 | Gururani | G06N 3/08 |
| 11,562,745 | B2 * | 1/2023 | Gaur | G10L 15/16 |
| 2020/0342849 | A1 * | 10/2020 | Yu | G10L 13/02 |
| 2021/0089909 | A1 * | 3/2021 | Binkowski | G06N 3/08 |

OTHER PUBLICATIONS

Ren et al., FastSpeech: Fast, Robust and Controllable Text to Speech, 2019, Entire Text (Year: 2019).*

(Continued)

*Primary Examiner* — Hai Phan
*Assistant Examiner* — Ian Scott McLean
(74) *Attorney, Agent, or Firm* — Fish & Richardson P.C.

(57) ABSTRACT

Methods, systems, and apparatus, including computer programs encoded on computer storage media, for using a generative neural network to convert conditioning text inputs to audio outputs. The generative neural network includes an alignment neural network that is configured to receive a generative input that includes the conditioning text input and to process the generative input to generate an aligned conditioning sequence that comprises a respective feature representation at each of a plurality of first time steps and that is temporally aligned with the audio output.

35 Claims, 8 Drawing Sheets

Discriminator Neural Network System 300

(56) References Cited

OTHER PUBLICATIONS

Kumar et al., MelGAN: Generative Adversarial Networks for Conditional Waveform Synthesis, 2019, Entire Text (Year: 2019).*
Kumar et al., MelGAN: Generative Adversarial Networks for Conditional Waveform Synthesis,, ArXiv, Cited portions of the text (Year: 2019).*
Abadi et al., "TensorFlow: Large-scale machine learning on heterogeneous systems," CoRR, Mar. 2016, arXiv:1603.04467, 19 pages.
Amodei et al., "Deep Speech 2: End-to-end speech recognition in English and Mandarin," Proceedings of The 33rd International Conference on Machine Learning, 2016, 48:173-182.
Arik et al., "Deep Voice: Real-time neural text-to-speech," Proceedings of the 34th International Conference on Machine Learning, 70:195-204.
Arik et al., "Fast spectrogram inversion using multi-head convolutional neural networks," IEEE Signal Processing Letters, Jan. 2019, 26(1):94-98.
Battenberg et al., "Location-relative attention mechanisms for robust long-form speech synthesis," ICASSP 2020—2020 IEEE International Conference on Acoustics, Speech and Signal Processing, May 2020, 5 pages.
Bengio et al., "Scheduled sampling for sequence prediction with recurrent neural networks," arXiv preprint arXiv:1506.03099, Jun. 2015, 9 pages.
Binkowski et al., "Demystifying MMD GANs," CoRR, Jan. 2018, arxiv.org/abs/1801.01401, 36 pages.
Binkowski et al., "High fidelity speech synthesis with adversarial networks," CoRR, Sep. 2019, arxiv.org/abs/1909.11646, 15 pages.
Brock et al., "Large scale GAN training for high fidelity natural image synthesis," CoRR, Feb. 2019, arxiv.org/abs/1809.11096, 35 pages.
Brock et al., "Neural photo editing with introspective adversarial networks," CoRR, Feb. 2017, arxiv.org/abs/1609.07093, 15 pages.
Buchlovsky et al., "TF-Replicator: Distributed machine learning for researchers," CoRR, Feb. 2019, arXiv:1902.00465, 12 pages.
Chevelu et al., "How to compare TTS systems: A new subjective evaluation methodology focused on differences," International Speech Communication Association, 2015, 5 pages.
Chiu et al., "Monotonic chunkwise attention," CoRR, Feb. 2018, arxiv.org/abs/1712.05382, 16 pages.
Clark et al., "Efficient video generation on complex datasets," CoRR, Sep. 2019, arXiv:1907.06571, 21 pages.
Cuturi et al., "Soft-DTW: a differentiable loss function for time-series," Proceedings of the 34th International Conference on Machine Learning, 2017, 70:894-903.
De Vries et al., "Modulating early visual processing by language," CoRR, Dec. 2017, arxiv.org/abs/1707.00683, 14 pages.
Défossez et al., "SING: Symbol-to-instrument neural generator," CoRR, Oct. 2018, arxiv.org/abs/1810.09785, 11 pages.
Denton et al., "Deep generative image models using a Laplacian pyramid of adversarial networks," CoRR, Jun. 2015, arxiv.org/abs/1506.05751, 10 pages.
Donahue et al., "Adversarial audio synthesis," CoRR, Feb. 2019, arxiv.org/abs/1802.04208, 16 pages.
Donahue et al., "Adversarial feature learning," CoRR, Nov. 2019, arxiv.org/abs/1907.02544, 32 pages.
Donahue et al., "End-to-End Adversarial Text-to-Speech," CoRR, Jun. 2020, arxiv.org/abs/2006.03575, 23 pages.
Donahue et al., "Large scale adversarial representation learning," CoRR, Nov. 2019, arXiv:1907.02544, 32 pages.
Dumoulin et al., "A learned representation for artistic style," CoRR, Feb. 2017, arxiv.org/abs/1610.07629, 26 pages.
Dumoulin et al., "Adversarially learned inference," CoRR, Feb. 2017, arxiv.org/abs/1606.00704, 18 pages.
Engel et al., "DDSP: Differentiable digital signal processing," CoRR, Jan. 2020, arxiv.org/abs/2001.04643, 19 pages.
Engel et al., "GANSynth: Adversarial neural audio synthesis," CoRR, Apr. 2019, arxiv.org/abs/1902.08710, 17 pages.
Engel et al., "Neural audio synthesis of musical notes with WaveNet autoencoders," Proceedings of the 34th International Conference on Machine Learning, 2017, 70:1068-1077.
Gibiansky et al., "Deep Voice 2: Multi-speaker neural text-to-speech," CoRR, May 2017, arxiv.org/abs/1705.08947, 15 pages.
Github.com [online], "bootphon/phonemizer," Jan. 6, 2021, retrieved on Sep. 9, 2021, retrieved from URL<https://github.com/bootphon/phonemizer/>, 8 pages.
Goodfellow et al., "Generative adversarial nets," Advances in neural information processing systems, 2014, 9 pages.
Graves et al., "Connectionist temporal classification: labelling unsegmented sequence data with recurrent neural networks," Proceedings of the 23rd international conference on Machine Learning, Jun. 2006, pp. 369-376.
Graves et al., "Generating sequences with recurrent neural networks," CoRR, Aug. 2013, arXiv:1308.0850, 43 pages.
Graves et al., "Sequence transduction with recurrent neural networks," CoRR, Nov. 2012, arXiv:1211.3711, 9 pages.
Gretton et al., "A kernel two-sample test," Journal of Machine Learning Research, 2012, 13:723-773.
Griffin et al., "Signal estimation from modified short-time Fourier transform," IEEE Transactions on Acoustics, Speech, and Signal Processing, Apr. 1984, 32(2):236-243.
Guo et al., "A new GAN-based end-to-end TTS training algorithm," CoRR, Apr. 2019, arxiv.org/abs/1904.04775, 5 pages.
He et al., "Robust sequence-to-sequence acoustic modeling with stepwise monotonic attention for neural TTS," CoRR, Aug. 2019, arxiv.org/abs/1906.00672, 5 pages.
Heusel et al., "GANs trained by a two time-scale update rule converge to a local nash equilibrium," Advances in neural information processing systems, 2017, 12 pages.
Hinton et al., "Distilling the knowledge in a neural network," CoRR, Mar. 2015, arxiv.org/abs/1503.02531, 9 pages.
Huang et al., "Multimodal unsupervised image-toimage translation," Proceedings of the European Conference on Computer Vision, 2018, pp. 172-189.
Hyun et al., "Geometric GAN," CoRR, May 2017, arXiv:1705.02894, 17 pages.
International Search Report and Written Opinion in International Appln. No. PCT/EP2021/065195, dated Oct. 25, 2021, 18 pages.
Ioffe et al., "Batch normalization: Accelerating deep network training by reducing internal covariate shift," Proceedings of the 32nd International Conference on Machine Learning, 2015, 37:448-456.
Isola et al., "Image-to-image translation with conditional adversarial networks," Proceedings of the IEEE Conference on Computer Vision and Pattern Recognition, 2017, pp. 1125-1134.
Itakura et al., "Minimum prediction residual principle applied to speech recognition," IEEE Transactions on Acoustics, Speech, and Signal Processing, Feb. 1975, 23(1):67-72.
Kalchbrenner et al., "Efficient neural audio synthesis," Proceedings of the 35th International Conference on Machine Learning, 2018, 80:2410-2419.
Karras et al., "A style-based generator architecture for generative adversarial networks," CoRR, Feb. 2018, arxiv.org/abs/1710.10196, 26 pages.
Karras et al., "Progressive growing of GANs for improved quality, stability, and variation," CoRR, Feb. 2018, arxiv.org/abs/1710.10196, 26 pages.
Kilgour et al., "Frechet audio distance: A metric for evaluating music enhancement algorithms," CoRR, Jan. 2019, arxiv.org/abs/1812.08466, 20 pages.
Kim et al., "FloWaveNet: A generative flow for raw audio," CoRR, May 2019, arxiv.org/abs/1811.02155, 9 pages.
Kim et al., "Glow-TTS: A generative flow for text-to-speech via monotonic alignment search," CoRR, Oct. 2020, arXiv:2005.11129, 14 pages.
Kingma et al., "Adam: A method for stochastic optimization," CoRR, Dec. 2014, arxiv.org/abs/1412.6980, 15 pages.
Kuchaiev et al., "OpenSeq2Seq: Extensible toolkit for distributed and mixed precision training of sequenceto-sequence models," Proceedings of Workshop for NLP Open Source Software, Jul. 2018, pp. 41-46.

(56) References Cited

OTHER PUBLICATIONS

Kumar et al., "MelGAN: Generative adversarial networks for conditional waveform synthesis," CoRR, Oct. 2019, arxiv.org/abs/1910.06711, 14 pages.
Kurach et al., "A large-scale study on regularization and normalization in GANs," Proceedings of the 36th International Conference on Machine Learning, 2019, 97:3581-3590.
Le Roux et al., "Fast signal reconstruction from magnitude STFT spectrogram based on spectrogram consistency," Proc. of the 13th Int. Conference on Digital Audio Effects (DAFx-10), Sep. 2010, 7 pages.
Lei Ba et al., "Layer normalization," CoRR, Jul. 2016, arXiv:1607.06450, 14 pages.
Li et al., "MoBoAligner: a Neural Alignment Model for Non-autoregressive TTS with Monotonic Boundary Search," CoRR, May 2020, arxiv.org/abs/2005.08528, 5 pages.
Li et al., "Neural speech synthesis with transformer network," Proceedings of the AAAI Conference on Artificial Intelligence, Jul. 2019, 33(1):AAAI-19, IAAI-19, EAAI-20.
Li et al., "Precomputed real-time texture synthesis with Markovian generative adversarial networks," European Conference on Computer Vision, Sep. 2016, 15 pages.
Loshchilov et al., "SGDR: Stochastic gradient descent with warm restarts," CoRR, May 2017, arxiv.org/abs/1608.03983, 16 pages.
Mehri et al., "SampleRNN: An unconditional end-to-end neural audio generation model," CoRR, Feb. 2017, arxiv.org/abs/1612.07837, 11 pages.
Miao et al., "Flow-TTS: A non-autoregressive network for text to speech based on flow," ICASSP 2020—2020 IEEE International Conference on Acoustics, Speech and Signal Processing, May 2020, 5 pages.
Miyato et al., "cGANs with projection discriminator," CoRR, Aug. 2018, arxiv.org/abs/1802.05637, 21 pages.
Miyato et al., "Spectral normalization for generative adversarial networks," CoRR, Feb. 2018, arxiv.org/abs/1802.05957, 26 pages.
Morise et al., "World: A vocoder-based high-quality speech synthesis system for real-time applications," IEICE Transactions on Information and Systems, Jul. 2016, E99-D(7):1877-1884.
Neekhara et al., "Expediting TTS synthesis with adversarial vocoding," CoRR, Jul. 2019, arxiv.org/abs/1904.07944, 5 pages.
Papamakarios et al., "Normalizing flows for probabilistic modeling and inference," CoRR, Apr. 2021, arXiv:1912.02762, 64 pages.
Peng et al., "Parallel neural text-to-speech," CoRR, Jun. 2020, arXiv:1905.08459, 13 pages.
Ping et al., "ClariNet: Parallel wave generation in end-to-end text-tospeech," CoRR, Feb. 2019, arxiv.org/abs/1807.07281, 15 pages.
Ping et al., "Deep Voice 3: 2000-speaker neural text-to-speech," CoRR, Feb. 2018, arxiv.org/abs/1710.07654, 16 pages.
Ping et al., "WaveFlow: A compact flow-based model for raw audio," CoRR, Jun. 2020, arXiv:1912.01219, 11 pages.
Prenger et al., "WaveGlow: A flow-based generative network for speech synthesis," ICASSP 2019—2019 IEEE International Conference on Acoustics, Speech and Signal Processing, May 2019, 5 pages.
Raffel et al., "Online and linear-time attention by enforcing monotonic alignments," Proceedings of the 34th International Conference on Machine Learning, 2017, 70:2837-2846.
Ranzato et al., "Sequence level training with recurrent neural networks," CoRR, May 2016, arxiv.org/abs/1511.06732, 16 pages.
Ren et al., "FastSpeech: Fast, robust and controllable text to speech," CoRR, Nov. 2019, arxiv.org/abs/1905.09263, 13 pages.
Sailor et al., "Fusion of magnitude and phase-based features for objective evaluation of TTS voice," The 9th International Symposium on Chinese Spoken Language Processing, Sep. 2014, 5 pages.
Saito et al., "TGANv2: Efficient training of large models for video generation with multiple subsampling layers," Computer Vision and Pattern Recognition, Nov. 2018, 12 pages.

Sakoe et al., "Dynamic programming algorithm optimization for spoken word recognition," IEEE Transactions on Acoustics, Speech, and Signal Processing, Feb. 1978, 26(1):43-49.
Saxe et al., "Exact solutions to the nonlinear dynamics of learning in deep linear neural networks," CoRR, Feb. 2014, arxiv.org/abs/1312.6120, 22 pages.
Shen et al., "Natural TTS synthesis by conditioning WaveNet on Mel spectrogram predictions," 2018 IEEE International Conference on Acoustics, Speech and Signal Processing, Apr. 2018, 5 pages.
Sotelo et al., "Char2Wav: End-to-end speech synthesis," ICLR, Apr. 2017, 6 pages.
Szegedy et al., "Rethinking the Inception architecture for computer vision," Proceedings of the IEEE Conference on Computer Vision and Pattern Recognition, 2016, pp. 2818-2826.
Taigman et al., "VoiceLoop: Voice fitting and synthesis via a phonological loop," CoRR, Jul. 2017, arXiv:1705.03122, 14 pages.
Tran et al., "Hierarchical implicit models and likelihood-free variational inference," CoRR, Feb. 2017, arxiv.org/abs/1702.08896, 15 pages.
Valin et al., "LPCNet: Improving neural speech synthesis through linear prediction," ICASSP 2019—2019 IEEE International Conference on Acoustics, Speech and Signal Processing, May 2019, 5 pages.
Valle et al., "Flowtron: an autoregressive flow-based generative network for text-to-speech synthesis," CoRR, May 2020, arXiv:2005.05957, 10 pages.
Van den Oord et al., "Parallel WaveNet: Fast high-fidelity speech synthesis," Proceedings of the 35th International Conference on Machine Learning, 2018, 80:3918-3926.
Van den Oord et al., "WaveNet: A generative model for raw audio," CoRR, Sep. 2016, arXiv:1609.03499, 15 pages.
Vasquez et al., "MelNet: A generative model for audio in the frequency domain," CoRR, Jun. 2019, arXiv:1906.01083, 14 pages.
Vaswani et al., "Attention is all you need," 31st Advances in Neural Information Processing Systems, 2017, 11 pages.
Wang et al., "Neural source-filter-based waveform model for statistical parametric speech synthesis," ICASSP 2019—2019 IEEE International Conference on Acoustics, Speech and Signal Processing, May 2019, 11 pages.
Wang et al., "Tacotron: Towards end-to-end speech synthesis," CoRR, Mar. 2017, arxiv.org/abs/1703.10135, 10 pages.
Wang et al., "Tacotron: Towards end-to-end speech synthesis," CoRR, Apr. 2017, arxiv.org/abs/1703.10135, 10 pages.
Williams et al., "A learning algorithm for continually running fully recurrent neural networks," Neural Computation, Jun. 1989, 1(2):270-280.
Yamamoto et al., "Parallel WaveGAN: A fast waveform generation model based on generative adversarial networks with multi-resolution spectrogram," ICASSP 2020—2020 IEEE International Conference on Acoustics, Speech and Signal Processing, May 2020, 5 pages.
Yamamoto et al., "Probability density distillation with generative adversarial networks for high-quality parallel waveform generation," CoRR, Apr. 2019, arxiv.org/abs/1904.04472, 5 pages.
Yang et al., "Multi-band MelGAN: Faster waveform generation for high-quality text-to-speech," 2021 IEEE Spoken Language Technology Workshop, Jan. 2021, 7 pages.
Yu et al., "Multi-scale context aggregation by dilated convolutions," CoRR, Apr. 2016, arxiv.org/abs/1511.07122, 13 pages.
Zen et al., "Statistical parametric speech synthesis," Speech Communication, Nov. 2009, 51(11):1039-1064.
Zhang et al., "Forward attention in sequence-to-sequence acoustic modeling for speech synthesis," 2018 IEEE International Conference on Acoustics, Speech and Signal Processing, Apr. 2018, 5 pages.
Zhang et al., "Neural models of text normalization for speech applications," Computational Linguistics, Jun. 2019, 45(2): 293-337.
Zhang et al., "Self-attention generative adversarial networks," Proceedings of the 36th International Conference on Machine Learning, 2019, 97:7354-7363.

(56) References Cited

OTHER PUBLICATIONS

Zhang et al., "Stackgan: Text to photo-realistic image synthesis with stacked generative adversarial networks," Proceedings of the IEEE International Conference on Computer Vision, 2017, pp. 5907-5915.
Zhao et al., "Wasserstein GAN and Waveform Loss-based Acoustic Model Training for Multi-speaker Text-to-Speech Synthesis Systems Using a WaveNet Vocoder," IEEE Access, Sep. 2018, 6:60478-60488.
Zhu et al., "Unpaired image-to-image translation using cycle-consistent adversarial networks," Proceedings of the IEEE International Conference on Computer Vision, 2017, pp. 2223-2232.
International Preliminary Report on Patentability in International Appln. No. PCT/EP2021/065195, dated Dec. 15, 2022, 11 pages.
Office Action in European Appln. No. 21731963.1, dated Sep. 3, 2024, 7 pages.

\* cited by examiner

GENERATING AUDIO DATA USING UNALIGNED TEXT INPUTS WITH AN ADVERSARIAL NETWORK

CROSS-REFERENCE TO RELATED APPLICATION

This application claims priority to U.S. Provisional Application No. 63/035,519, filed on Jun. 5, 2020. The disclosure of the prior application is considered part of and is incorporated by reference in the disclosure of this application.

BACKGROUND

This specification relates to generating audio data using adversarial neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that generates output audio examples using a feedforward generative neural network.

In one aspect, the present specification describes a computer-implemented method of training a feedforward generative neural network having a plurality of generative parameters. The neural network is configured to generate output audio examples using conditioning text inputs. Each conditioning text input includes a feature representation at each input time step of a plurality of input time steps and each output audio example includes a respective audio sample at each output time step of a plurality of output time steps. The feature representations at each input time step are an embedding of a corresponding portion of the raw text represented by the conditioning text input, e.g., embeddings of characters, phonemes, or words. Moreover, the "input time steps" are not aligned temporally with the "output time steps." That is, there is no information received that specifies the alignment or correspondence between which input time step should be used to generate the output example at each output time step.

Instead, the method first uses an alignment neural network to predict the duration of each input feature representation and to generate an aligned conditioning sequence that is temporally aligned with the output audio example and generates the output audio example from the aligned conditioning sequence.

Later the feature representation is referred to as a linguistic feature representation, but the qualification "linguistic" is optional.

The feedforward generative neural network is configured to receive a generative input, which includes the conditioning text input. The generative neural network processes the generative input to generate the audio output.

The generative neural network is trained. The training process starts by obtaining a training conditioning text input. The next step in the training includes processing a training generative input, which includes the training conditioning text input using the feedforward generative neural network. The generative neural network is configured with a current set of values used as the generative parameters that generate a training audio output. The processing step of training further includes processing the training generative input using an alignment neural network to generate an aligned conditioning sequence, in particular, temporally aligned with the audio output. The aligned conditioning sequence includes a feature representation at each of a plurality of first time steps. The feature representation may be a representation of the audio output to be generated for the time step, e.g., it may be an audio feature representation.

The processing step of training further includes a step of processing the aligned conditioning sequence using a generator neural network to generate the training audio output. The training further includes a step of processing the training audio output using each of one or more discriminators. Each discriminator predicts whether the training audio output is a real audio example or a synthetic audio example. The training step further includes a step of determining a final prediction using the respective predictions of the one or more discriminators. The training step further includes a step of determining an update to the current values of the generative parameters to increase a first error in the final prediction.

In another aspect, the specification describes a computer-implemented method of generating output audio examples using conditioning text inputs. Each conditioning text input includes a respective feature representation, which may be termed a linguistic feature representation, at each of a plurality of input time steps. The method of generating the output audio examples includes a step of obtaining a conditioning text input. The method of generating the output audio examples includes a step of processing a generative input that includes the conditioning text input using a feedforward generative neural network. The generated output audio includes audio samples at each of a plurality of output time steps. The processing step of generating output audio examples includes a first step of processing the generative input using an alignment neural network to generate an aligned conditioning sequence, in particular temporally aligned with the audio output. The aligned conditioning sequence includes a respective feature representation (which may be termed an audio feature representation) at each of a plurality of first time steps. The processing step of generating output audio examples includes a second step of processing the aligned conditioning sequence using a generator neural network to generate the audio output.

Any of a range of different techniques may be used to generate the aligned conditioning sequence; some particular techniques are described later. When an alignment neural network is used to generate the aligned conditioning sequence the alignment neural network may be trained in any convenient manner for example, but not necessarily, as described herein. In general features of the alignment neural network, and of the method of generating the aligned conditional sequence, may be the same for both training and inference. Thus, for example, generating the aligned conditional sequence may involve processing the generative input using a first subnetwork to generate an intermediate sequence having a respective intermediate element at each of a plurality of intermediate time steps, processing the intermediate sequence using a second subnetwork to generate, for each intermediate element, a length prediction characterizing a predicted length of time for the intermediate element, and processing the respective length predictions to generate the aligned conditioning sequence. The respective intermediate elements may have a variable length (duration). The alignment neural network can generate the aligned conditioning sequence by interpolating, e.g., non-uniformly or non-linearly interpolating, the intermediate sequence using the respective length predictions of the intermediate elements to generate the feature representation at each first time step. For example the length predictions may be used to determine weights of a weighted combination of the intermediate elements determining the feature representation at a first time step.

The subject matter described in this specification can be implemented in particular embodiments so as to realize one or more of the following advantages.

A feedforward generative neural network as described in this specification can generate output examples faster than existing techniques that rely on autoregressive generative neural networks, e.g., WaveNet, which is important for applications where fast batched inference is important. Autoregressive neural networks generate output examples across multiple output time steps by performing a forward pass at each output time step. At a given output time step, the autoregressive neural network generates a new output sample to be included in the output example conditioned on the output samples that have already been generated. This can consume a large amount of computational resources and take a large amount of time. A feedforward generative neural network, on the other hand, can generate output examples in a single forward pass while maintaining a high degree of quality of the generated output examples. This greatly reduces the time and amount of computational resources required to generate the output example relative to how much time is consumed by an autoregressive neural network.

Some existing training systems for speech synthesis systems require the conditioning text input and the ground-truth audio output in the training example to be aligned, which requires large, hand-curated training data sets. Generating this training data can be very expensive and time-consuming. Using techniques described in this specification, a training system can automatically learn an optimal alignment of a conditioning text input and the audio output.

Some existing speech synthesis systems include large pipelines of multiple different subsystems that each have to be designed and trained individually, in isolation from the rest of the pipeline. Using techniques described in this specification, a training system can teach a single end-to-end system to generate audio outputs from conditioning text inputs, significantly decreasing the complexity of the system and the time required for training, and thus saving significant time and computational resources.

Other existing techniques rely on invertible feedforward neural networks that are trained by distilling an autoregressive model using probability density, e.g., Parallel WaveNet. Training in this way allows the invertible feedforward neural networks to generate speech signals that sound realistic and correspond to input text without having to model every possible variation that occurs in the data. A feedforward generative neural network as described in this specification can also generate realistic audio samples that adhere faithfully to input text without having to explicitly model the data distribution of the audio data, but can do so without the distillation and invertibility requirements of invertible feedforward neural networks.

Using discriminators that only process samples of the audio data allows the system to discriminate between lower-dimensional distributions. Assigning each discriminator a particular window size allows the discriminators to operate on different frequencies of the audio samples, increasing the realism of the audio samples generated by the feedforward generative neural networks. Using discriminators that only process samples of the audio data also reduces the computational complexity of the discriminators, which can allow the system to train the feedforward generative neural network faster.

Using dilated convolutional layers further broadens the receptive fields of the feedforward generative neural network and the discriminators, allowing the respective networks to learn dependencies at various frequencies, e.g., both long-term and short term frequencies.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that trains a generative neural network to generate output audio examples using conditioning text inputs. The system can train the generative neural network in an adversarial manner using an alignment neural network, a decoder neural network, and one or more discriminator networks. The trained network can receive conditioning text input, and convert it to generated audio.

The text to speech system includes systems for performing two primary operations. The first system is a training system that trains a feedforward generative neural network for use in mapping conditioning text inputs and, optionally, additional information to output audio examples. The second system is an inference system that uses the trained feedforward generative neural network to perform inference, i.e., to map new conditioning text inputs to output audio examples using the feedforward generative neural network.

Figure 1A:
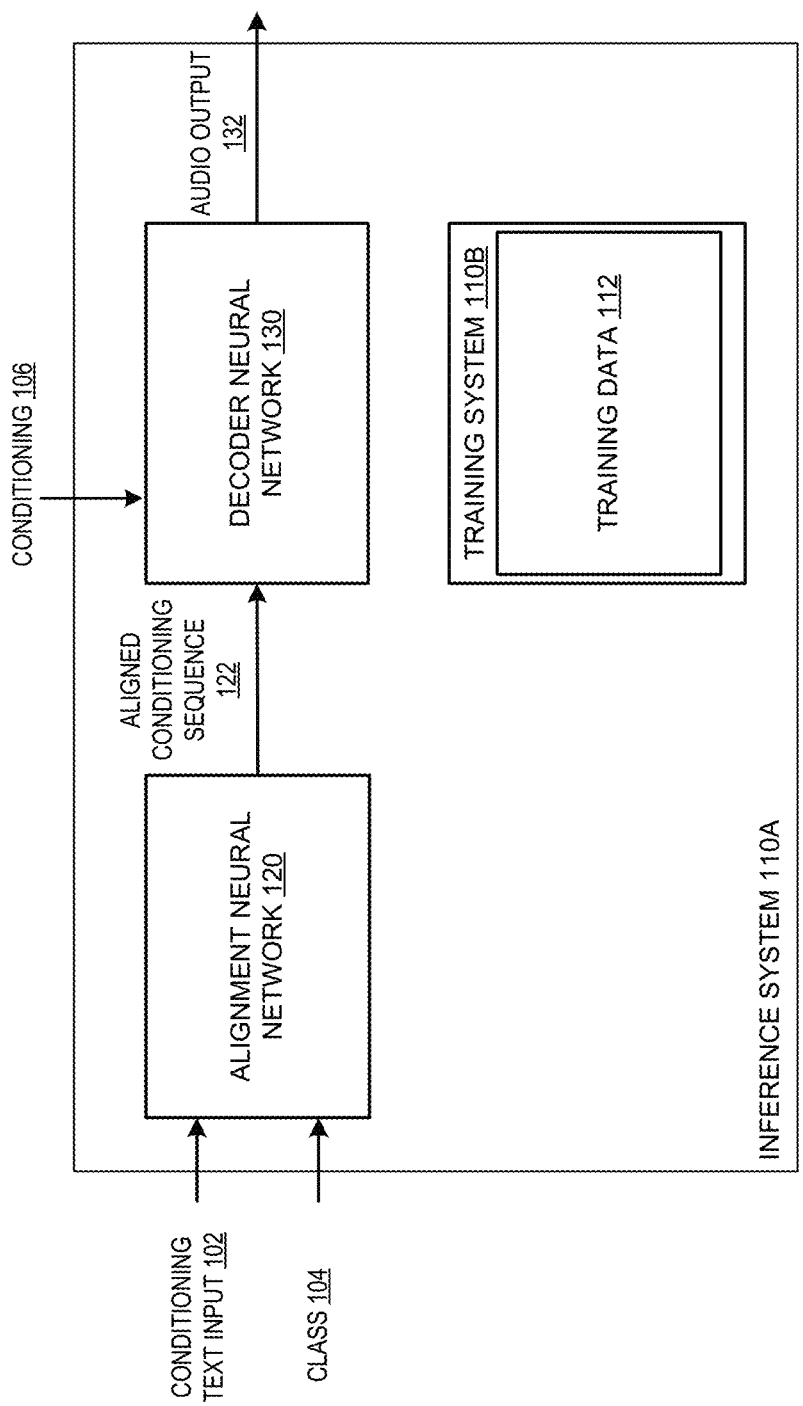
FIG. 1A is a diagram of an example text to speech inference system.

FIG. 1A is a diagram of an example inference system 110A of a text to speech system 100. The inference system 110A is an example of a system implemented as computer programs on one or more computers in one or more locations, in which the systems, components, and techniques described below can be implemented.

The inference system 110A receives as input a conditioning text input 102 and uses a trained feed-forward speech generative neural network to generate an audio output 132, i.e., to generate an output audio example that includes a sample of an audio wave at each of a sequence of output time steps. The audio sample at a given time step can be an amplitude value of the audio wave or a compressed or companded amplitude value.

Each conditioning text input 102 represents an input text on which the corresponding output audio example 132 is conditioned, and includes a sequence of one or more (linguistic) feature representations. Generally, the (linguistic) feature representations include word-level, phoneme-level, or character-level embeddings of the text.

In this specification, an embedding is an ordered collection of numeric values that represents an input in a particular embedding space. For example, an embedding can be a vector of floating point or other numeric values that has a fixed dimensionality. It may be provided by an embedding neural network layer.

The generative neural network for the inference system 110A includes an alignment neural network 120, and a decoder neural network 130.

Prior to being used for inference, a training system 110B trains the alignment neural network 120 and the decoder neural network 130 on training data 112. The training system 110B operates to optimize the performance of the alignment neural network 120 and the decoder neural network 130 using the existing set of training data 112 as the ground truth data set. Additional details of the training system will be described below with reference to FIG. 1B.

The inference system 110A is configured to receive the conditioning text input 102 at an input, and to process the conditioning text input 102 through the alignment neural network 120 and the decoder neural network 130 to generate the audio output 132. In some implementations, the alignment neural network 120 and the decoder neural network 130 are configured as a feedforward neural network, i.e., the alignment neural network 120 and the decoder neural network 130 generate the audio output 132 in a single forward pass.

Generally, the neural networks of either the alignment neural network 120 or the decoder neural network 130 can have any appropriate neural network architecture capable of generating the described results.

The alignment neural network 120 processes the conditioning text input to generate an aligned conditioning sequence that includes a respective feature representation at each of multiple first time steps and that is temporally aligned with the generated audio output. "Temporally aligned" means that each feature representation of the conditioning sequence corresponds to a different time window in the generated audio output, in particular with no overlap between the different time windows. That is, the alignment neural network 120 is trained such that the feature representations of the aligned conditioning sequence 122 for a given conditioning input are temporally aligned to the elements of the ground-truth audio output for the conditioning input. The feature representations of the aligned conditioning sequence can be in a learned, abstract feature space. The aligned conditioning sequence 122 can have a smaller frequency than the audio output, i.e., a frequency of the first time steps may be lower than a frequency of the output time steps. As a particular example, the aligned conditioning sequence can have a frequency of 200 Hz, whereas the audio output can have a frequency of 24 kHz. In some implementations, the aligned conditioning sequence 122 can be input into the decoder neural network 130.

The alignment neural network 120 can include a first subnetwork that processes the conditioning text input to generate an intermediate sequence having a respective intermediate element at each of multiple intermediate time steps. For example, the first subnetwork can process the conditioning text input using one or more dilated convolutional neural network layers. In some implementations, the first subnetwork also processes a sampled noise embedding, e.g., $z \sim N(0, I_d)$, where N( ) is a normal distribution and I is an identity matrix of size d. For example, the first subnetwork can modulate the scale and shift parameters of one or more batch normalization layers using the sampled noise embedding. In some implementations, the first subnetwork can also or instead module the scale and shift parameters of one or more batch normalization layers using a speaker identification embedding.

A characteristic of the intermediate elements, later referred to as tokens, is that they have a variable length, in this context a variable duration. In some implementations, the intermediate sequence has the same length as the conditioning text input 102, i.e., each intermediate element can be an embedding of a corresponding linguistic feature representation in the conditioning text input 102 that encodes context information from the surrounding linguistic feature representations.

The alignment neural network 120 can include a second subnetwork that processes the intermediate sequence to generate, for each intermediate element, a length prediction that characterizes a predicted length of time for the intermediate element. That is, the length prediction represents a time duration that the speech represented by the intermediate element will be spoken in the audio output. For example, the second subnetwork can process the intermediate sequence using a pointwise multi-layer perceptron, i.e., the same multi-layer perceptron may process each individual intermediate element of the intermediate sequence. In some implementations, the second subnetwork, e.g., the pointwise multi-layer perceptron, can also process a sampled noise embedding and/or a speaker identification embedding.

The alignment neural network 120 can then process the length predictions to generate the aligned conditioning sequence 122. In some implementations, the alignment neural network 120 determines a cumulative length prediction using the respective length predictions of the intermediate elements, e.g., by computing a sum of the length predictions. Then, the alignment neural network 120 can determine a number of first time steps in the aligned conditioning sequence using i) the cumulative length prediction and ii) a predetermined frequency of first time steps in the aligned conditioning sequence 120. That is, the alignment neural network determines how many intermediate elements should be included in the conditioning sequence.

The alignment neural network 120 can generate the aligned conditioning sequence 122 by interpolating, e.g., non-uniformly or non-linearly interpolating, the intermediate sequence using the respective length predictions of the intermediate elements to generate the feature representation at each first time step. That is, for each first time step, the alignment neural network can generate the corresponding (audio) feature representation by processing the intermediate elements using interpolation e.g., by determining a weighted combination of the intermediate elements (so that in this sense the interpolation may be considered non-uniform).

For example, the alignment neural network 120 can determine, according to the respective length predictions of the intermediate element, a predicted position in time for each intermediate element, e.g., a centerpoint of each length prediction, $$c_n = \sum_{m=1}^{n} \left(l_m - \frac{1}{2}l_n\right),$$

where $l_m$ is the length prediction of the mth intermediate element.

The alignment neural network 120 can then determine, for each intermediate element and each first time step, a respective weight value, w. For example, for each intermediate element n and for each first time step t, the alignment neural network 120 can compute $$w_t^n = \frac{\exp(-\sigma^{-2}(t-c_n)^2)}{\sum_{m=1}^{N} \exp(-\sigma^{-2}(t-c_m)^2)},$$

where N is the number of intermediate elements, $c_n$ is the predicted position in time for the $n^{th}$ intermediate element, and $\sigma^2$ is a predetermined temperature parameter. Thus, for example, a weight w may depend on a softmax over a squared difference between t and $c_n$, scaled by a temperature parameter.

The alignment neural network 120 can then determine, for each first time step, the corresponding feature representation in the aligned conditioning sequence 122 by combining the intermediate elements using the respective weight values corresponding to the first time step and each intermediate elements. For example, the alignment neural network 120 can determine the feature representation for first time step t by computing a weighted sum of the intermediate elements where each intermediate element is weighted by the corresponding computed weight, $a_t = \sum_{n=1}^{N} w_t^n h_n$, where $h_n$ is the nth intermediate element.

The operations of the alignment neural network are described in more detail below with reference to FIG. 2.

In some implementations, the alignment neural network 120 can also receive as input an identification of a class 104 to which the audio output 132 should belong. The class 104 can be a member of a set of possible classes. For example, the class 104 can correspond to a particular speaker or class of speaker that the audio output 132 should sound like. The class may comprise a speaker identification or speaker identification embedding, e.g., for a class of speaker such as female or male, young or old, or having a regional accent. That is, the audio output 132 can depict the particular speaker or speaker class speaking the input text.

The decoder neural network 130, also called the generator neural network 130, can process the aligned conditioning sequence 122 to generate the audio output 132. The generator neural network 130 can include a sequence of groups of one or more convolutional neural network layers. Each group of convolutional neural network layers can include one or more dilated convolutional layers.

As shown in FIG. 1A, the generator neural network 130, or the decoder neural network 130, includes the ability to embed additional conditioning 106, which may include mood or tone into the generated audio output 132. For example, the conditioning text input 102 can include linguistic features characterizing the text input. For example, additional conditioning 106, such as mood, tone, or even accents can be added through an input to the generator neural network. In addition to being able to select a speaker ID or class 104, the additional conditioning 106 allows a user to include specific linguistic features that may not be present in the selected class 104, which may include adjusting the pitch, which can be represented by a logarithmic fundamental frequency log F0 of the input time step, or adding inflection. The output of the generator neural network 130 includes audio output 132, generated by a selected speaker ID or class 104, with additional conditioning 106, such as pitch, mood, tone, or inflection, as determined by the user.

In some implementations, the decoder neural network 130 takes at an input the aligned conditioning sequence 122. The decoder neural network 130 receives the aligned conditioning sequence 122 and generates a generated speech sequence representative of the aligned conditioning sequence 122. Optionally, the decoder neural network 130 includes a second input for receiving additional conditioning 106, which can be applied to the speech sequence as it is generated. The conditioning 106 can include phase information that was removed from the class input 104, which can alter the accent of the speech, or the tone or mood of the speech that is generated.

Generally, the sequence of input time steps to the aligner blocks of the inference system 110A and the sequence of output time steps that are generated at the output of the decoder blocks characterize the same period of time, e.g., 1, 2, 5, or 10 seconds. As a particular example, if the period of time is 2 seconds, then the conditioning input 102 can include 400 input time steps (resulting in a time step frequency of 200 Hz), while the audio output 132 can include 48,000 time steps (resulting in an audio sample frequency of 24 kHz). Thus, the neural network of the inference system can generate audio samples for multiple output time steps (in this case, 120) for each single input time step.

In some implementations in which the neural network includes a sequence of one or more generator blocks, because of the difference in frequencies of the input time steps and the output time steps, one or more of the generator blocks in the neural network can include one or more respective upsampling layers. A dimensionality of the layer output of each upsampling layer is larger than a dimensionality of the layer input of the upsampling layer. The total degree of upsampling across all generator blocks in the neural network can be proportional to the ratio of frequencies of the output time steps and the input time steps.

Figure 1B:
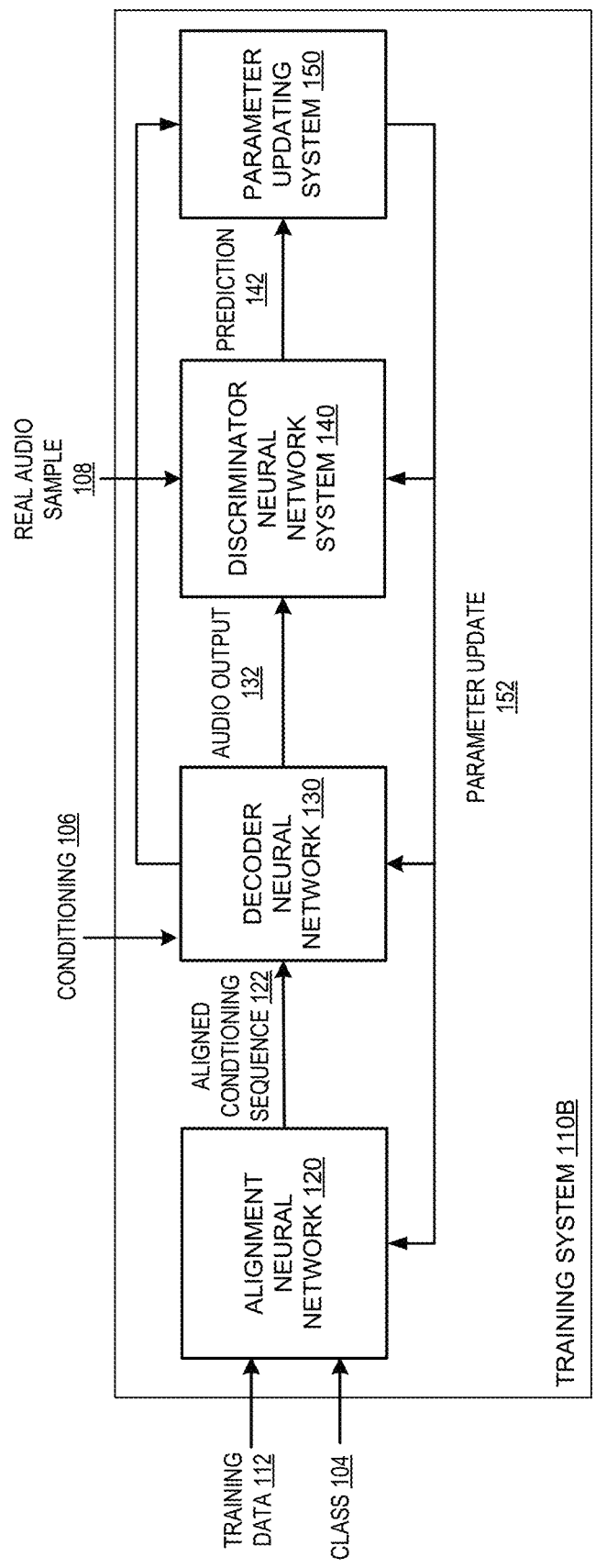
FIG. 1B is a diagram of an example text to speech training system.

FIG. 1B is a diagram of the example training system 110B of the text to speech system. The training system 110B is an example of a system implemented as computer programs on one or more computers in one or more locations, in which the systems, components, and techniques described below can be implemented.

The system 110B trains the feed-forward neural network that includes the alignment neural network 120, the decoder neural network 130 using one or more discriminator neural networks 140, and a parameter update system 150.

The training system 110B operates by processing training examples from a training data set using the feedforward generative neural network. Each training example can include a training conditioning text input and a ground-truth audio output. In implementations the training conditioning text input and the ground-truth audio output are not aligned. That is, the training example does not include a monotonic mapping from the linguistic feature representations of the training conditioning text input to the elements of the ground-truth audio output. In some implementations, the feedforward generative neural network also receives as input an identification of a class to which the audio output should below, e.g., an identification of the speaker of the audio output.

The training system 110B is configured to receive training data 112 as an input to the alignment neural network 120. The training data 112 includes multiple training examples that each include at least (i) a piece of text, and (ii) a waveform representing the text being spoken, i.e., the ground truth speech output. The training data 112 is provided as input to the alignment neural network 120, which generates an aligned conditioning sequence 122.

After the generator neural network generates an audio output 132, the training system 110B can provide the audio output 132 to the discriminator neural network system 140. The training system 110B can train the discriminator neural network system 140 to process an audio sample and to generate a prediction 142 of whether the audio sample is real, i.e., an audio sample captured in the real world, or synthetic, i.e., an audio sample that has been generated by the generative neural network. The generative neural network includes the alignment neural network 120 and the decoder neural network 130.

The discriminator neural network system 140 can have any appropriate neural network architecture that is suitable for generating audio output predictions as previously stated. As a particular example, the discriminator neural network system 140 can include one or more discriminators that each process the audio output 132 and predict whether the audio output 132 is real or synthetic. Each discriminator can include a sequence of groups of convolutional neural network layers, called "discriminator blocks." Example discriminator blocks are described below with respect to FIG. 3.

In some implementations, the one or more discriminators of the discriminator neural network system 140 include one or more conditional discriminators and one or more unconditional discriminators. The conditional discriminators receive as input i) the audio output 132 generated by the generative neural network and ii) the conditioning text input 102 that the generative neural network used to generate the audio output 132. The unconditional discriminators receive as input the output audio 132 generated by the generative neural network, but do not receive as input the conditioning text input 102. Thus, the conditional discriminators can measure how well the audio output 132 corresponds to the input text characterized by the conditioning text input 102 in addition to measuring the general realism of the audio output 132, whereas the unconditional discriminators only measure the general realism of the audio output 132. In some implementations, the unconditional discriminators can also process a speaker identity embedding. An example discriminator neural network system is described in more detail below with respect to FIG. 4 below.

The training system 110B can train the feedforward generative neural network in an adversarial manner using the one or more discriminators. That is, each of the discriminators predicts whether the output of the feedforward generative neural network is a real or synthetic example of audio data. The training system 110B system can combine the respective predictions of all of the discriminators, e.g., by computing an average of the predictions or determining a vote of each prediction, to generate a final prediction. The training system 110B can update the parameters of the feedforward generative neural network to increase an error of the final prediction. In doing this, the parameter updating system 150 can obtain the prediction 142 generated by the discriminator neural network system 140 and determine a parameter update 152 according to an error in the prediction 142. The parameter update system 150 can update the parameters of each discriminator to decrease the error of the final prediction or an error in the respective prediction of the discriminator system 140. Additionally, the parameter update system 150 can apply parameter updates 152 to the parameters of the generative neural network, including the alignment neural network 120 and the decoder neural network 130 and the discriminator neural network system 140. That is, the training system 110B can train the generative neural network and the discriminators in the discriminator neural network system 140, such that the parameters in each of the alignment neural network 120, the decoder neural network 130, and the discriminator neural network 140 can be trained and updated concurrently.

Generally, the parameter updating system 150 determines the parameter update 152 to the parameters of the generative neural network in order to increase the error in the prediction 142. For example, if the discriminator neural network system 140 correctly predicted that the audio output 132 is synthetic, then the parameter updating system 150 generates a parameter update 152 to the parameters of the generative neural network in order to improve the realism of the audio output 132. By doing so, the discriminator neural network system 140 might incorrectly predict the next audio output 132 to be real.

Conversely, the parameter updating system 150 determines the parameter update 152 to the parameters of the discriminator neural network system 140 in order to decrease the error in the prediction 142. For example, if the discriminator neural network system 140 incorrectly predicted that the audio output 132 is real, then the parameter updating system 150 generates a parameter update 152 to the parameters of the discriminator neural network system 140 in order to improve the predictions 142 of the discriminator neural network system 140.

In some implementations in which the discriminator neural network system 140 includes multiple different discriminators, the parameter updating system 150 determines a parameter update 152 for each discriminator using the prediction 142 output by the discriminator neural network system 140. That is, the parameter updating system 150 determines a parameter update 152 for each particular discriminator using the same combined prediction 142 that was generated by combining the respective predictions of the multiple discriminators, regardless of the respective prediction generated by the particular discriminator.

In some other implementations in which the discriminator neural network system 140 includes multiple different discriminators, the parameter updating system 150 determines a parameter update 152 for each discriminator using the respective prediction generated by the discriminator. That is, the parameter updating system 150 generates the parameter updates 152 for a particular discriminator in order to improve the respective prediction generated by the particular discriminator. An additional advantage is that improving the predictions of a particular generator will indirectly improve the combined prediction 142 output by the discriminator neural network system 140 because the combined prediction 142 is generated according to the respective predictions generated by the multiple discriminators.

During training, the training system 110B can also provide real audio samples 108 to the discriminator neural network system 140. Each discriminator in the discriminator neural network system 140 can process the real audio sample 108 to predict whether the real audio sample 108 is a real or synthetic example of audio data. Again, the discriminator neural network system 140 can combine the respective predictions of each of the discriminators to generate a second prediction 142. The parameter updating system 150 can then determine a second parameter update 152 to the parameters of discriminator neural network system 140 according to an error in the second prediction 142. Generally, the training system 110B does not use the second prediction corresponding to the real audio sample 108 to update the parameters of the generative neural network.

In some implementations in which the generative neural network has been trained to generate synthetic audio outputs 132 that belong to a class 104, the discriminator neural network system 140 does not receive as input an identification of a class 104 to which a received (real or synthetic) audio example belongs. However, the real audio samples 108 received by the discriminator neural network system 140 can include audio samples that belong to each of the classes 104 in the set of classes.

As a particular example, parameter updating system 150 can use the Wasserstein loss function to determine the parameter update 152, which is:

$$D(x)-D(G(z)),$$

where D(x) is the likelihood assigned by the discriminator neural network system 140 that a real audio sample 108 is real, G(z) is a synthetic audio output 132 generated by the generative neural network, and D(G(z)) is the likelihood assigned by the discriminator neural network system 140 that the synthetic audio output 132 is real. The objective of the generative neural network is to minimize Wasserstein loss by maximizing D(G(z)), i.e., by causing the discriminator neural network system 140 to predict that a synthetic audio output 132 is real. The objective of the discriminator neural network system 140 is to maximize Wasserstein loss, i.e., correctly predict both real and synthetic audio examples.

As another particular example, the parameter updating system 150 can use the following loss function:

$$\log(D(x))+\log(1-D(G(z)))$$

where again the objective of the generative neural network is to minimize the loss and the objective of the discriminator neural network system 140 is to maximize the loss.

The training system 110B can backpropagate the loss through both the generative neural network and the discriminator neural network system 140, thus training both networks concurrently.

In some implementations, the training system 110B can determine an aligner length loss that characterizes an error in the length of the training audio output 132, and determine the update to the parameters of the feedforward generative neural network using the aligner length loss. For example, the aligner length loss can be $$\mathcal{L}_{length} = \left(L - \sum_{n=1}^{N} l_n\right)^2,$$

where L is a length of a ground-truth audio 108 corresponding to the training conditioning text input 112, N is a number of intermediate elements, and $l_n$ is the length prediction of the $n^{th}$ intermediate element generated by the alignment neural network. That is, the training system 110B can determine updates to the parameter values of the alignment neural network based on the errors in the length predictions, i.e., the difference between the length (in time) of the ground truth output and the total predicted length (in time) of the feature representations as predicted by the alignment neural network.

In some implementations, the one or more discriminators in the discriminator neural network 140 includes one or more spectrogram discriminators. The training system 110B can process the training audio output 132 to generate a spectrogram of the training audio output 132 (as used here a spectrogram is a shorthand reference to the corresponding data). The spectrogram may be, e.g., a log-scaled mel-spectrogram, e.g., derived from a STFT (Short Time Fourier Transform). The training system 110B may process the spectrogram using the spectrogram discriminator to generate a prediction 142 of whether the training audio output 132 is a real or synthetic audio example. In some implementations, the spectrogram discriminators also process a speaker ID, or class 104 embedding. The spectrogram discriminators can include one or more convolutional neural network layers that process the spectrogram. That is, the set of discriminators 140 can include one or more discriminators that operate on spectrograms rather than on audio example. The discriminator(s) that operate on spectrograms can be trained as described above for the remaining discriminators 140 in the set.

In some implementations, the training system 110B can determine a spectrogram prediction loss, and determine the update to the parameters 152 of the feedforward generative neural network using the spectrogram prediction loss. That is, the training system 110B can generate i) a spectrogram of the training audio output 132 and ii) a spectrogram of the ground-truth audio 108 output, and determine a difference between the two spectrograms.

In some implementations, the spectrogram prediction loss is $$\mathcal{L}_{pred} = \frac{1}{F} \sum_{t=1}^{T} \sum_{f=1}^{F} |S_{gt}[t, f] - S_{gen}[t, f]|,$$

where $S_{gt}$ is the ground-truth spectrogram, $S_{gen}$ is the predicted spectrogram, T is a number of time points in the spectrograms, and F is a number of frequency bins in the spectrograms.

In some other implementations, the training system 110B can determine the spectrogram prediction loss using an implementation of dynamic time warping. That is, because the two spectrograms are not necessarily perfectly aligned, the spectrogram can determine an optimal path through the two respective spectrograms that optimizes the alignment of the two spectrograms. The spectrogram loss and the dynamic time warping calculations are discussed in more detail with reference to FIG. 5 below.

As a particular example, the training system 110B can compute a combined loss function, $$\mathcal{L}_G = \mathcal{L}_{G,adv} + \lambda_{pred} * \mathcal{L}_{pred} + \lambda_{length} \mathcal{L}_{length},$$

where $L_{G,adv}$ is the adversarial loss, $L_{pred}$ is the prediction loss, $L_{length}$ is the length loss and the λ values are scalar weights. The training system 110B can determine an update to the parameters 152 of the feedforward generative neural network using the combined loss.

Figure 2:
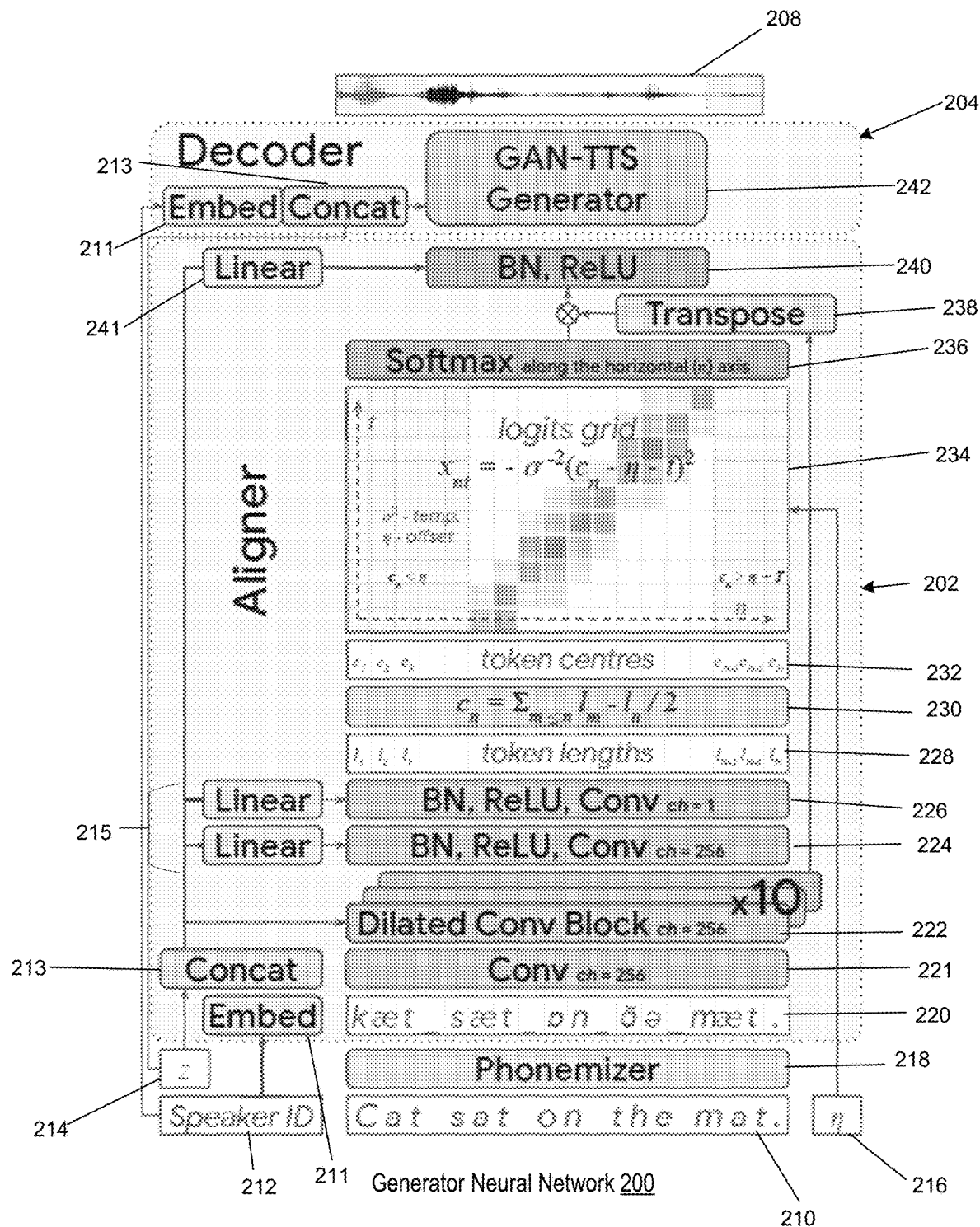
FIG. 2 is a diagram of an example generator block showing the layers of a Generative Adversarial Network.

FIG. 2 is a diagram of a generator neural network 200.

The generator neural network 200 includes the alignment neural network 120, which includes a set of alignment blocks and the decoder neural network 130, which includes a set of generator blocks.

The generator neural network 200 is configured to process a conditioning text input 206 and to generate an audio output 208. The generator neural network 200 is configured to receive as input a text block 210 or, some cases, a set of phonemes 200 that has been generated from the text block 210 by a phonemizer 218.

In some implementations, the generator neural network can also be configured to receive as input a speaker ID 212, a latent vector 214, and, during training, a set of random offsets 216 used to select the window of features that will be provided to the decoder neural network.

One or more generator blocks of the generator neural network 200 can also receive the identification of the speaker ID 212 as input.

When used, the phonemizer 218 receives the conditioning text input 210 and converts it into phonemes, i.e., into a set of independent units of sound that are perceptible in the language of choice.

The alignment neural network 120 can include a first subnetwork that includes a first convolutional layer 221 and multiple first blocks 222 and that processes the conditioning text input to generate an intermediate sequence having a respective intermediate element at each of multiple intermediate time steps. For example, the first subnetwork can first process an embedding of the text input 210 or of the phonemes 220 using the first convolutional layer 221 and then process the output of the first convolutional layer 221 using the multiple first blocks 22, which each process the input to the block using one or more dilated convolutional neural network layers. In some implementations, the blocks in the first subnetwork also process a sampled noise embedding, i.e., the latent vector 214, e.g., $z \sim N(0, I_d)$, where I is an identity matrix of size d; the size of d is arbitrary, e.g., d=128. For example, the first subnetwork can modulate the scale and shift parameters of one or more batch normalization layers in the block using the sampled noise embedding. In some implementations, the first subnetwork can also or instead module the scale and shift parameters of one or more batch normalization layers in the block using a speaker identification embedding.

In some implementations, the intermediate sequence has the same length as the conditioning text input 102, i.e., each intermediate element can be an embedding of a corresponding linguistic feature representation in the conditioning text input 102 that encodes context information from the surrounding linguistic feature representations.

The first blocks 222 can be configured with any appropriate architecture for generating the desired output. As shown in FIG. 2, the first subnetwork includes a first convolutional block followed by a group of 10 dilated convolutional blocks. The specific number of dilated convolutional blocks can vary based on memory requirements, performance, speed, or any of a variety of other factors.

In some implementations, each first block 222 can include multiple dilated convolutional neural network layers with increasing dilation. For example, the dilation value can double for each dilated convolutional neural network layer starting from an initial dilation, and then return to the initial dilation in the next aligner block.

In some implementations, the first blocks 222 is configured serially, such that the output of a preceding block is provided directly as input to the next block in the group of aligner blocks 222. Each subsequent aligner block in the sequence of aligner blocks receives, as input, the block output generated by the previous aligner block in the sequence of aligner blocks.

The alignment neural network also includes a second subnetwork that processes the intermediate sequence generated by the last first block to generate, for each intermediate element, a length prediction that characterizes a predicted length of time for the intermediate element. That is, the length prediction represents a time duration that the speech represented by the intermediate element will be spoken in the audio output. For example, the second subnetwork can process the intermediate sequence using a pointwise multi-layer perceptron (MLP) or can process the intermediate sequence using two second blocks 224 and 226 that each include a batch normalization layer, an activation layer, which is shown as a ReLU layer, and a convolutional neural network layer to either generate the length predictions or to generate the input to the pointwise MLP.

In some implementations, the second subnetwork is also conditioned on the speaker ID 212, the noise input, i.e., latent vector 214, or both. For example, the batch normalization layer in blocks 224 and 2226 can be a conditional batch normalization layer that is conditioned according to the output of a respective linear layer 215. The linear layer 215 can combine, e.g., concatenates the linear embedding of the speaker ID 212 to which the output audio should belong (e.g., a particular speaker that the output audio should sound like) with noise input 214 to generate a combined representation and provide the combined representation to the conditional batch normalization layer. The conditional batch normalization layer can then condition on the combined representation.

The length predictions are a length N vector 228 of the predicted token lengths for the N elements in the output of the blocks 222, i.e., that includes a respective predicted token length for each intermediate element in the intermediate sequence. Each predicted token length in the length N vector has a predicted length $l_m$, where m is the m-th predicted token length in the N-length vector of predicted tokens lengths and corresponds to the m-th intermediate element in the output of block 222, i.e., in the intermediate sequence. The total length $l_n$ of the tokenized conditioning text input 210 is equal to the sum of all $l_m$ tokens. The associated length $l_m$ of each phonemes is indicative of a predicted duration (in time) of pronunciation associated with the predicted phoneme. The length of the tokens can vary between each token, with the total length being the sum of all tokens in the vector of predicted tokens. The (output) tokens are arranged in a vector, with each token (also referred to as an "intermediate element") having an associated length $l_m$.

In some implementations, the alignment neural network receives the predicted lengths 228 and determines the center position $c_n$ 230 of each token. The center is computed by the equation $c_n = \Sigma_{m \leq n} l_m - \frac{1}{2} l_n$. The computed token centers 232 for all N intermediate elements (or "tokens") are provided as output and are used as input to the windowing aligner block 234 in the generator neural network 200 for optimizing the alignment of the intermediate sequence with time steps t.

In some implementations, during training, the windowing aligner block 234, which is represented as an alignment grid in FIG. 2, aligns the predicted tokenized sequence 228 with a set of random offsets in time. For training, the decoder neural network may need to receive a fixed length input and generate a fixed length output. Thus, in this case, the step of alignment can be executed for a shortened snapshot, or a shortened window of the 210 in order to provide the decoder neural network 130 with a fixed length input. For inference, the alignment step must be performed for the entire input sequence.

In some implementations, the operations of the windowing aligner block 234 can be explained as a grid. Along the horizontal axis of the grid is a number n, which corresponds to the nth token in the predicted tokenized sequence 228. The vertical axis corresponds to time t, and each step can align to an offset η from the beginning of the sequence. The offset can be randomly sampled from a distribution and provided as input to the neural network. In some implementations, the alignment step only needs to consider offsets η at which the token of interest overlaps with the offset. As shown in FIG. 2, the alignments of interest during training are represented by the non-greyed out blocks, e.g., the region of white blocks and the darkened blocks within the region of white blocks that represent areas of overlap.

The windowing aligner block 234 generates the weights for each token n and a given time t by the following equation:

$$w_t^n = \frac{\exp(-\sigma^{-2}(t-c_n)^2)}{\sum_{m=1}^{N} \exp(-\sigma^{-2}(t-c_m)^2)}.$$

The block 234 then generates the feature representation at time t in the aligned conditioning sequence by generating a weighted combination of the N feature representations in the intermediate sequence using the determined weights for time t:, $a_t = \sum_{n=1}^{N} w_t^n h_n$, where $w_t^n$ is the weight of the nth token for time t.

During training, the neural network only needs to generate the aligned conditioning sequence feature representations for the times that are in the window of fixed size that is defined by the offset. After training, during inference, the neural network generates an aligned conditioning sequence that represents the entire text input 210.

In some implementations, the last block 240 of the alignment neural network 202 is a batch normalization and activation layer. The last block 240 has an input for receiving the optimally aligned tokenized output sequence from the transposition layer 238, and an input for receiving linear conditioning 241. The linear conditioning is combined with the batch normalization and activation layers to embed linguistic conditioning features into the output text, such as speaker ID 212. The output of the last block is an aligned conditioning sequence that can be decoded by the decoder block 204, where an audio output is generated.

TABLE 1

Example Generator Neural Network Architecture

| Layer | Time Dimension | Frequency | Num. of Channels |
|---|---|---|---|
| Aligned Cond. Sequence | 400 | 200 Hz | 256 |
| Input Conv. Layer | 400 | 200 Hz | 768 |
| G-Block | 400 | 200 Hz | 768 |
| G-Block | 400 | 200 Hz | 768 |
| G-Block, upsample ×2 | 800 | 400 Hz | 384 |
| G-Block, upsample ×2 | 1600 | 800 Hz | 384 |
| G-Block, upsample ×2 | 3200 | 1600 Hz | 384 |
| G-Block, upsample ×3 | 9600 | 4800 Hz | 192 |
| G-Block, upsample ×5 | 48000 | 24 kHz | 96 |
| Output Conv. Layer | 48000 | 24 kHz | 1 |

Table 1 describes an example architecture of a generator neural network 200. The example shown in Table 1 is for illustrative purposes only, and many different configurations of generator neural networks are possible. The input to the generator neural network 200 is a vector of linguistic features for each input time step of 400 input time steps that correspond to two seconds of audio (a frequency of 200 Hz). Each vector of linguistic features corresponding to a respective input time step includes 567 channels.

As described above, the decoder neural network can have any appropriate architecture that allows the decoder to map the final aligned sequence to the audio example. As one example, the decoder can have the architecture described in Mikolaj Binkowski, Jeff Donahue, Sander Dieleman, Aidan Clark, Erich Elsen, Norman Casagrande, Luis C. Cobo, and Karen Simonyan. High fidelity speech synthesis with adversarial networks. In ICLR, 2020." which is hereby incorporated herein by reference.

Figure 3:
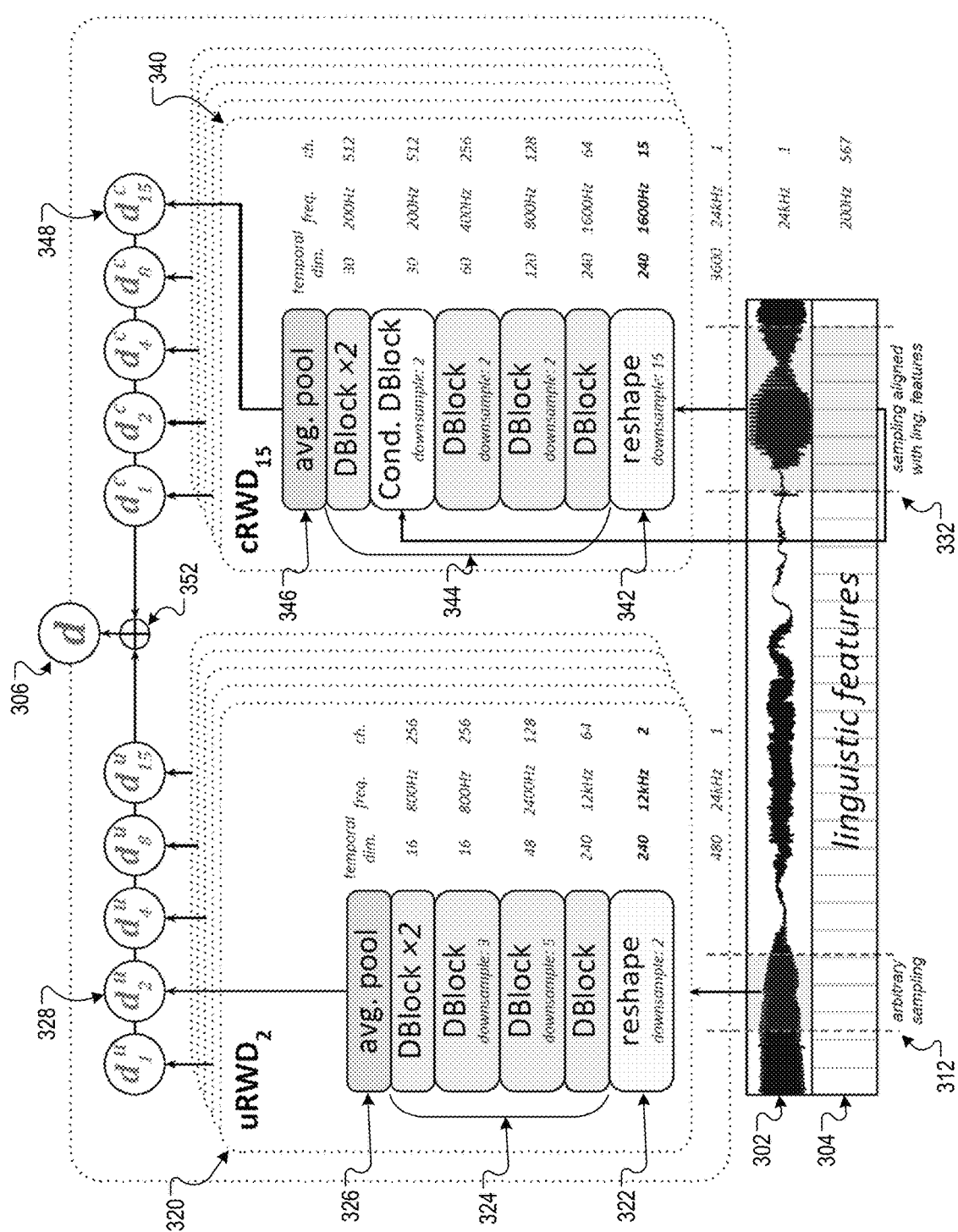
FIG. 3 is a diagram of an example discriminator neural network system.

FIG. 3 is a diagram of an example discriminator neural network system 300.

The discriminator neural network system 300 can be a component of a training system, e.g., the training system 110B depicted in FIG. 1B, that is configured to train a generator neural network 200. The discriminator neural network system 300 has been trained to receive an audio example 302 and generate a prediction 306 of whether the audio example is a real audio example or a synthetic audio example generated by the generator neural network. The audio example can include a respective amplitude value at each output time step in a sequence of output time steps (called "output" time steps because the audio example might have been the output of the generator neural network). The audio example corresponds to a conditioning text input 304 that includes a respective vector of linguistic features at each input time step in a sequence of input time steps. Note that even if the audio example 302 is a real audio example, the conditioning text input 304 still corresponds to the audio example 302.

The discriminator neural network system 300 can include one or more unconditional discriminators, one or more conditional discriminators, or both. In the example depicted in FIG. 3, the discriminator neural network system 300 includes five unconditional discriminators, including unconditional discriminator 320, and five conditional discriminators, including conditional discriminator 340.

In some implementations, instead of processing the entire audio example 302, each of the discriminators in the discriminator neural network system 300 processes a different subset of the audio example (in particular, a so-called proper subset according to the mathematical definition). For example, each of the discriminators can randomly sample a subset of the audio example 302. That is, each discriminator only processes the amplitudes of a sub-sequence of consecutive output time steps of the audio example 302, wherein the sub-sequence of consecutive output time steps is randomly sampled from the entire sequence of output time steps. In some implementations, the size of the random sample, i.e., the number of output time steps sampled, is the same for each discriminator. In some other implementations, the size of the random sample is different for each discriminator, and is called the "window size" of the discriminator.

In some implementations, one or more of the discriminators in the discriminator neural network system 300 can have the same network architecture and the same parameter values. For example, a training system can update the one or more discriminators in the same way during training of the discriminator neural network system.

In some implementations, different discriminators have different window sizes. For example, for each window size in a set of multiple window sizes, the system can include one conditional discriminator with the window size and one unconditional discriminator with the window size. As a particular example, the discriminator neural network 300 includes one conditional discriminator and one unconditional discriminator corresponding to each window size in a set of five window sizes (240, 480, 960, 1920, and 3600 output time steps).

Each conditional discriminator also obtains a sample of the conditioning text input 304 corresponding to the random sample of the audio example 302 obtained by the conditional discriminator. Because the sample of the audio example 302 and the sample of the conditioning text input 304 must align, conditional discriminators can be constrained to sample a sub-sequence of the audio output 302 that begins at the same point that an input time step of the conditioning text input 304 begins. That is, because the number of input time steps in the conditioning text input 304 is less than the number of output time steps in the audio example 302, each conditional discriminator can be constrained to sample the audio example 302 at a point that aligns with an input time step of the conditional text input 304. Because unconditional discriminators do not process the conditioning text input 304, unconditional discriminators do not have this constraint.

In some implementations, before processing a random sample of the audio example 302, each discriminator first downsamples the random sample by a factor proportional to the window size of the discriminator using a "reshaping" layer. Downsampling effectively allows discriminators with different window sizes to process the audio example 302 at different frequencies, where the frequency that a particular discriminator operates on is proportional to the window size of the particular discriminator. Downsampling by a factor proportional to the window size also allows each downsampled representation to have a common dimensionality, which allows each of the discriminators to have a similar architecture and similar computational complexity despite having different window sizes. In the example depicted in FIG. 3, the common dimensionality is 240 time steps; each discriminator is labeled with the factor k by which the discriminator downsamples its random sample (1, 2, 4, 8, and 15 respectively).

In some implementations, the discriminators downsample the respective random sample of the audio example 302 using a strided convolutional neural network layer, i.e., a neural network layer configured to perform a strided convolution.

The unconditional discriminator 320 randomly samples a sample 312 that includes 480 output time steps from the audio example 302. The unconditional discriminator 320 includes a reshaping layer 322 that downsamples the random sample 312 by 2× to generate a network input that includes 240 time steps.

The unconditional discriminator 320 includes a sequence 324 of discriminator blocks ("DBlocks"). Although the unconditional discriminator 320 is depicted as including five discriminator blocks, in general an unconditional discriminator can have any number of discriminator blocks. Each discriminator block in the unconditional discriminator 320 is an unconditional discriminator block. An example unconditional discriminator block is described below with respect to FIG. 4.

The first discriminator block in the sequence 324 of discriminator blocks is configured to receive the network input from the reshaping layer 322 and to process the network input to generate a block output. Each subsequent discriminator block in the sequence 324 of discriminator blocks is configured to receive as input the block output generated by the previous discriminator block in the sequence 324 and to generate a subsequent block output.

In some implementations, one or more discriminator blocks in the unconditional discriminator 320 performs further downsampling. For example, as depicted in FIG. 3, the second discriminator block in the sequence 324 of discriminator blocks downsamples by 5×, while the third discriminator block in the sequence 324 downsamples by 3×. Generally, downsampling helps the unconditional discriminator 320 limit the dimensionality of internal representations, increasing efficiency and allowing the unconditional discriminator 320 to learn relationships between more distant elements of the sample 312 of the audio example 302. In some implementations, the number of downsampling layers in a respective unconditional discriminator and the degree of downsampling performed by the respective unconditional discriminator depends on the factor k of the respective unconditional discriminator.

The unconditional discriminator 320 includes an output layer 326 that receives as input the block output of the final discriminator block in the sequence 324 of discriminator blocks and generates a prediction 328. The prediction 328 predicts whether the audio example is a real or synthetic audio example. For example, the output layer 326 can be an average pooling layer that generates a scalar that characterizes a likelihood that the audio example 302 is a real audio example, where a larger scalar value indicates a higher confidence that the audio example 302 is real.

The conditional discriminator 340 randomly samples a sample 332 that includes 3600 output time steps from the audio example 302. The conditional discriminator 340 includes a reshaping layer 342 that downsamples the random sample 332 by 15× to generate a network input that includes 240 time steps.

The conditional discriminator 340 includes a sequence 344 of discriminator blocks. Although the conditional discriminator 340 is depicted as including five unconditional discriminator blocks and one conditional discriminator block, in general a conditional discriminator can have any number of conditional and unconditional discriminator blocks.

The first discriminator block in the sequence 344 of discriminator blocks is configured to receive the network input from the reshaping layer 342 and to process the network input to generate a block output. Each subsequent discriminator block in the sequence 344 of discriminator blocks is configured to receive as input the block output generated by the previous discriminator block in the sequence 344 and to generate a subsequent block output.

The conditional discriminator block is configured to receive as input both i) the block output of the previous discriminator block in the sequence 344 and ii) a sample of the conditioning text input 304 corresponding to the sample 332 of the audio example. An example conditional discriminator block is described below with respect to FIG. 4.

Because of the difference in frequencies of the output time steps and the input time steps, one or more of the unconditional discriminator blocks preceding the conditional discriminator block in the sequence 344 of discriminator blocks and/or the conditional discriminator block itself can perform downsampling. For example, the total degree of downsampling across all discriminator blocks in the conditional discriminator 340 can be proportional to the ratio of frequencies of the input time steps and the output time steps. In the example depicted in FIG. 3, the conditional discriminator 340 downsamples the network input by 8× to reach a frequency of 200 Hz, which is the same frequency as the conditioning text input.

The conditional discriminator 340 includes an output layer 346 that receives as input the block output of the final discriminator block in the sequence 344 of discriminator blocks and generates a prediction 348 of whether the audio example is a real or synthetic audio example. For example, the output layer 346 can be an average pooling layer that generates a scalar that characterizes a likelihood that the audio example 302 is a real audio example.

After each discriminator in the discriminator neural network system 300 generates a prediction, the discriminator neural network system 300 can combine the respective predictions to generate a final prediction 306 of whether the audio example is a real or synthetic audio example. For example, the discriminator neural network system 300 can determine a sum or average of the respective predictions of the discriminators. As another example, the discriminator neural network system 300 can generate the final prediction 306 according to a voting algorithm, e.g., predicting that the audio example 302 is a real audio example if and only if the majority of discriminators predicted the audio example 302 to be a real audio example.

Note that the discriminator neural network system 300 does not receive as input a class associated with the audio input. However, in some implementations, the discriminator neural network system 300 can do so, e.g., as a further conditioning input to the conditioning discriminator block of each conditional discriminator.

Figure 4:
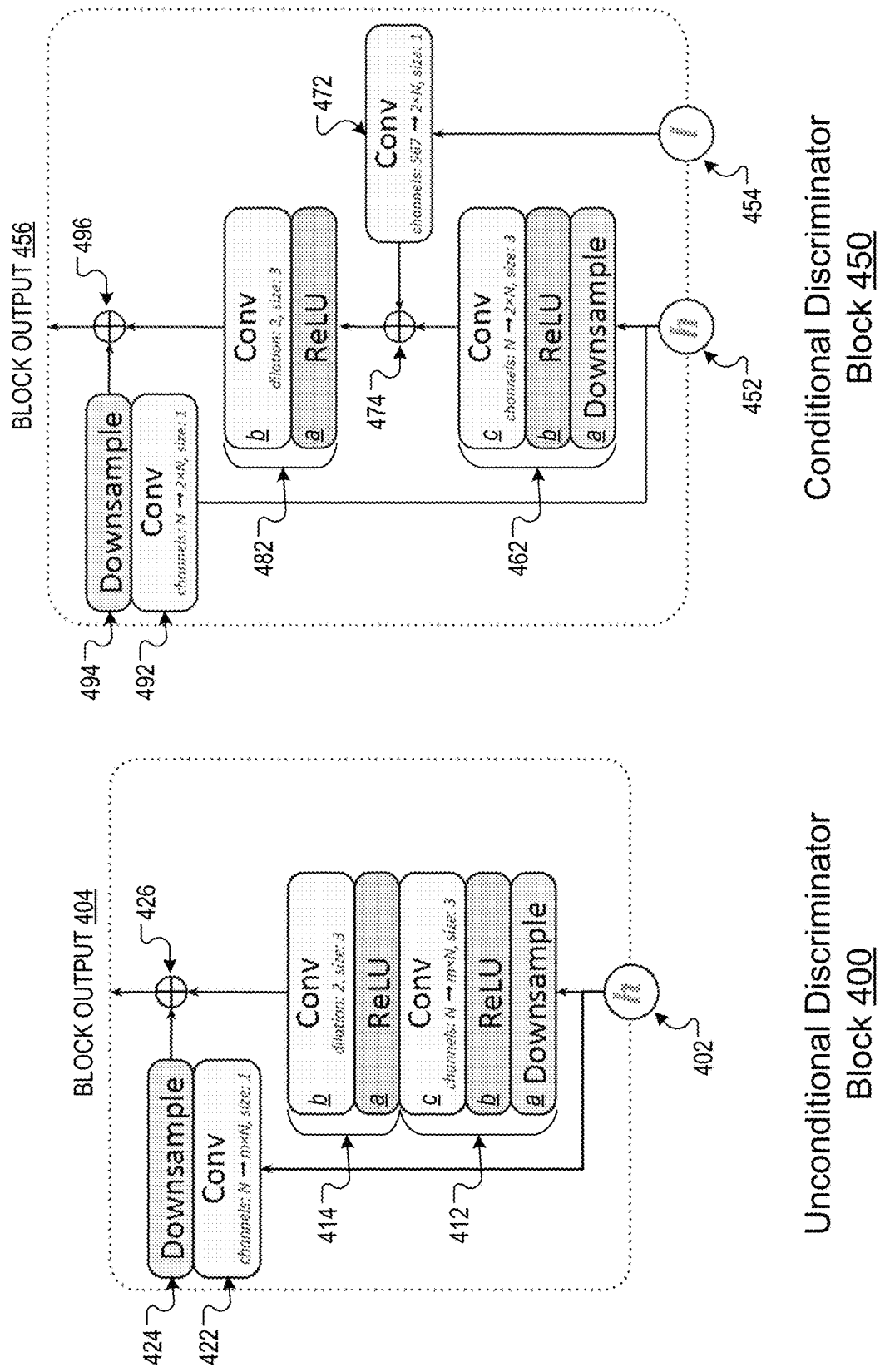
FIG. 4 is a diagram of an example unconditional discriminator block and an example conditional discriminator block.

FIG. 4 is a diagram of an example unconditional discriminator block 400 and an example conditional discriminator block 450. The discriminator blocks 400 and 450 can be components of a discriminator neural network system, e.g., the discriminator neural network system 140 depicted in FIG. 1B. The discriminator neural network system can include one or more discriminators, and each discriminator can include a sequence of one or more discriminator blocks. In some implementations, each discriminator block in the sequence of discriminator blocks in a discriminator has the same architecture. In some other implementations, one or more discriminator blocks have a different architecture than the other discriminator blocks in the sequence of discriminator blocks in a discriminator.

The unconditional discriminator block 400 can be a component of one or more unconditional discriminators, one or more conditional discriminators, or both. The conditional discriminator block 450 can only be a component of one or more conditional discriminators. That is, a conditional discriminator can include an unconditional discriminator block, but an unconditional discriminator cannot include a conditional discriminator block.

The unconditional discriminator block 400 is configured to receive a block input 402 and to generate a block output 404. In some implementations, if the unconditional discriminator block 400 is the first discriminator block in the sequence of discriminator blocks of a discriminator, then the block input 402 is an audio example. In some other implementations, if the unconditional discriminator block 400 is the first discriminator block in the sequence of discriminator blocks of a discriminator, then the block input 402 is an embedding of the audio example, e.g., an embedding generated by an input convolutional neural network layer of the discriminator. If the unconditional discriminator block 400 is not the first discriminator block in the sequence, then the block input 402 can be the block output of the previous discriminator block in the sequence.

The unconditional discriminator block 400 includes a first stack 412 of neural network layers that includes a downsampling layer 412a, an activation layer 412b, and a convolutional neural network layer 412c.

For unconditional discriminator blocks that downsample the block input 402, e.g., the second and third discriminator blocks in the sequence 324 of discriminator blocks depicted in FIG. 3, the downsampling layer 412a downsamples the block input 402 by the corresponding downsampling factor. Although the unconditional discriminator block 400 depicted in FIG. 4 has a single downsampling layer 412a, in general an unconditional discriminator block can have any number of downsampling layers throughout the unconditional discriminator block.

In some implementations, the activation layer 412b can be a ReLU activation layer.

The convolutional neural network layer 412c processes a layer input that includes N channels for each element and generates a layer output that includes m·N channels for each element. N corresponds to the number of channels in the block input 202 and m corresponds to a multiplier. In some cases, m=1. In general any one or more of the convolutional layers of an unconditional discriminator block can change the number of channels of the layer input.

The unconditional discriminator block 400 includes a second stack 414 of neural network layers that processes the output of the first stack 412 of neural network layers. The second stack 414 of neural network layers includes an activation layer 414a and a convolutional neural network layer 414b.

The unconditional discriminator block 400 includes a skip connection 426 that combines the input to the first stack 412 of neural network layers with the output of the second stack 414 of neural network layers. For example, the skip connection 426 can add or concatenate the input to the first stack 412 of neural network layers and the output of the second stack 414 of neural network layers.

In cases where the first stack 412 or the second stack 414 of neural network layers includes a convolutional neural network layer that changes the number of channels of the layer input, e.g., the convolutional neural network layer 412c, the unconditional discriminator block can include another convolutional neural network layer 422 before the skip connection 426, so that the two inputs to the skip connection 426 have the same number of channels.

In cases where the first stack 412 or the second stack 414 of neural network layers includes a downsampling layer, e.g., the downsampling layer 412a, the unconditional discriminator block can include another downsampling layer 424 before the skip connection 426, so that the two inputs to the skip connection 426 have the same dimensionality.

In some implementations, one or more of the convolutional neural network layers in the unconditional discriminator block 400 are dilated convolutional layers.

The conditional discriminator block 450 is configured to receive a block input 452 and the conditioning text input 454 corresponding to the audio example and to generate a block output 456.

The conditional discriminator block 450 includes a first stack 462 of neural network layers that includes a downsampling layer 462a, an activation layer 462b, and a convolutional neural network layer 462c.

For conditional discriminator blocks that downsample the block input 452, the downsampling layer 462a downsamples the block input 452 by the corresponding downsampling factor. Although the conditional discriminator block 450 depicted in FIG. 4 has a single downsampling layer 462a, in general a conditional discriminator block can have any number of downsampling layers throughout the conditional discriminator block. In particular, the conditional discriminator block 450 downsamples the layer input 452 so that it has the same dimensionality in the time dimension as the conditioning text input 454.

In some implementations, the activation layer 462b can be a ReLU activation layer.

The convolutional neural network layer 462c processes a layer input that includes N channels for each element and generates a layer output that includes m·N channels for each element; in this example m=2. In general any one or more of the convolutional layers of a conditional discriminator block can change the number of channels of the layer input.

The conditional discriminator block 450 includes a convolutional neural network layer 472 that processes the conditioning text input 454 and generates a layer output that includes m·N channels for each element. That is, the convolutional neural network layer 472 changes the number of channels of the conditioning text input (in this case, 567) to match the output of the convolutional neural network layer 462c in the first stack 462 of neural network layers.

The conditional discriminator block 450 includes a combining layer 474 that combines the output of the convolutional neural network layers 462c and 472, e.g., by addition or by concatenation.

The conditional discriminator block 450 includes a second stack 482 of neural network layers that processes the output of the combining layer 474. The second stack 482 of neural network layers includes an activation layer 482a and a convolutional neural network layer 482b.

The conditional discriminator block 450 includes a skip connection 496 that combines the input to the first stack 462 of neural network layers with the output of the second stack 482 of neural network layers. For example, the skip connection 496 can add or concatenate the input to the first stack 462 of neural network layers and the output of the second stack 482 of neural network layers.

In cases where the first stack 462 or the second stack 482 of neural network layers include a convolutional neural network layer that changes the number of channels of the layer input. For example, the convolutional neural network layer 462c, the conditional discriminator block 450 can include another convolutional neural network layer 492 before the skip connection 496, so that the two inputs to the skip connection 496 have the same number of channels.

In cases where the first stack 462 or the second stack 482 of neural network layers includes a downsampling layer, e.g., the downsampling layer 462a, the conditional discriminator block 450 can include another downsampling layer 494 before the skip connection 496, so that the two inputs to the skip connection 496 have the same dimensionality.

In some implementations, one or more of the convolutional neural network layers in the conditional discriminator block 450 are dilated convolutional layers.

In addition to or instead of the discriminators shown in FIGS. 3 and 4, the discriminator system can also include one or more spectrogram discriminators, e.g., that are also convolutional neural networks as described above, that receive as input a spectrogram and predict whether the spectrogram is of a real audio example or a synthetic audio example.

Figure 5:
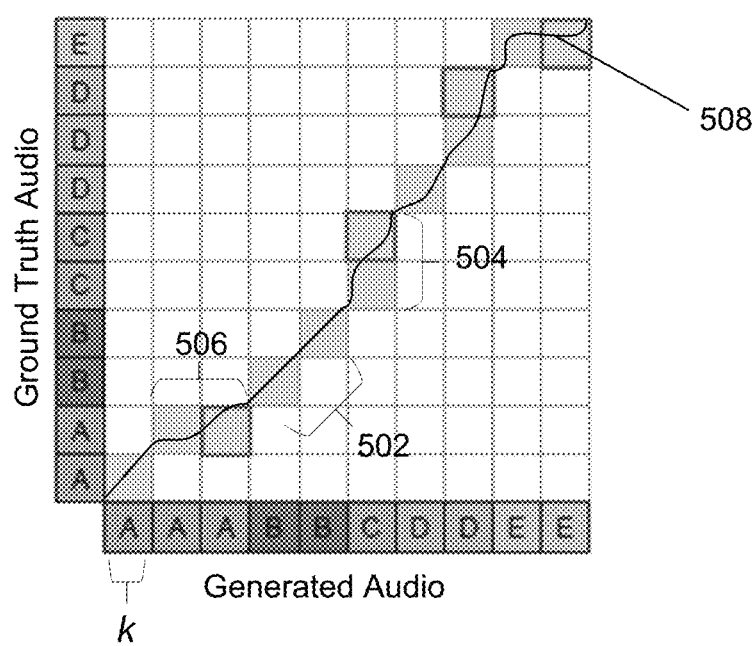
FIG. 5 an example of the dynamic time warping process illustrating an optimal alignment path.

FIG. 5 shows an implementation of dynamic time warping method that aids in aligning the generated spectrograms with the ground truth spectrograms for computing the spectrogram prediction loss.

The generated output tokens do not have a fixed length, their length can vary from one token to the next. The prediction loss is calculated by an iterative process which finds a minimal cost alignment path 508 between the spectrograms of the generated output tokens and the ground truth audio.

Each step k in the path 508 includes a pair of time points, including a first time point representing a time point in the ground-truth spectrogram and a second time point representing a time point in the predicted spectrogram. In the example shown in FIG. 5, the generated audio has 10 points distributed along the horizontal axis, while the ground truth audio has 10 points distributed along the vertical axis. The 12 pairs of time points in the path are represented by the shaded points in FIG. 5. The spectrogram alignment begins at the first step on each sequence, e.g., $\{A_{gt,1}, A_{ga,1}\}$. At each step k, the system can determine to either advance both spectrograms by one time point, or advance one of the spectrograms but not the other. That is, at each step $k \in [1, K_p-1]$, the system determines the next element of the alignment path according to one of the following actions:

Item 502, $p_{gen,k+1}=p_{gen,k}+1$, $p_{gt,k+1}=p_{gt,k}+1$,
Item 504, $p_{gen,k+1}=p_{gen,k}$, $p_{gt,k+1}=p_{gt,k}+1$, or
Item 506, $p_{gen,k+1}=p_{gen,k}+1$, $p_{gt,k+1}=p_{gt,1}$.

This results in a path $p = \langle (p_{gen,1}, p_{gt,1}), \ldots, (p_{gen,K_p}, p_{gt,K_p}) \rangle$ of length $K_p$ elements, where each element $(.,.)$ comprises a matched pair of time points, $p_{gen}$ indexes elements of a subpath in a time dimension of the predicted spectrogram, and $p_{gt}$ indexes elements of a subpath in a time dimension of the ground-truth spectrogram. One or more such paths may be used to determine the spectrogram prediction loss.

In some implementations, the system can determine the path 508 greedily, i.e., at each step $k \in [1, K_p-1]$, select the action that minimizes a step cost. The step cost can be a combination of a distance between $S_{gen}[p_{gen,k}]$ and $S_{gt}[p_{gt,k}]$ and a warp penalty w if $S_{gt}$ and $S_{gen}$ are not both advanced.

In some other implementations, the system can determine the path 508 globally, i.e., for each possible path, determine a total path cost by combining the step costs of each step of the possible path and selected the possible path that minimizes the total path cost. For example, the total path cost for a possible alignment path can be $$c_p = \sum_{k=1}^{K_p} \left( w \cdot \delta_k + \frac{1}{F} \sum_{f=1}^{F} |S_{gen}[p_{gen,k}, f] - S_{gt}[p_{gt,k}, f]| \right),$$

where $\delta_k$ is an indicator that is 1 for steps for which $S_{gt}$ and $S_{gen}$ are not both advanced; F is a number of frequency bins in the spectrograms; and $K_p$ is a number of elements of the possible alignment path, $T \leq K_p \leq 2T-1$, where T is a number of time points in the spectrograms.

In some such implementations, the spectrogram prediction loss is $$\mathcal{L}'_{pred} = \min_{p \in \mathcal{P}} c_p,$$

where P is a set of possible alignment paths. In some other such implementations, the spectrogram prediction loss is:

$$\mathcal{L}''_{pred} = -\tau \cdot \log \Sigma_{p \in \mathcal{P}} \exp\left(-\frac{c_p}{\tau}\right),$$

where P is a set of possible alignment paths, and τ is a temperature parameter.

Figure 6:
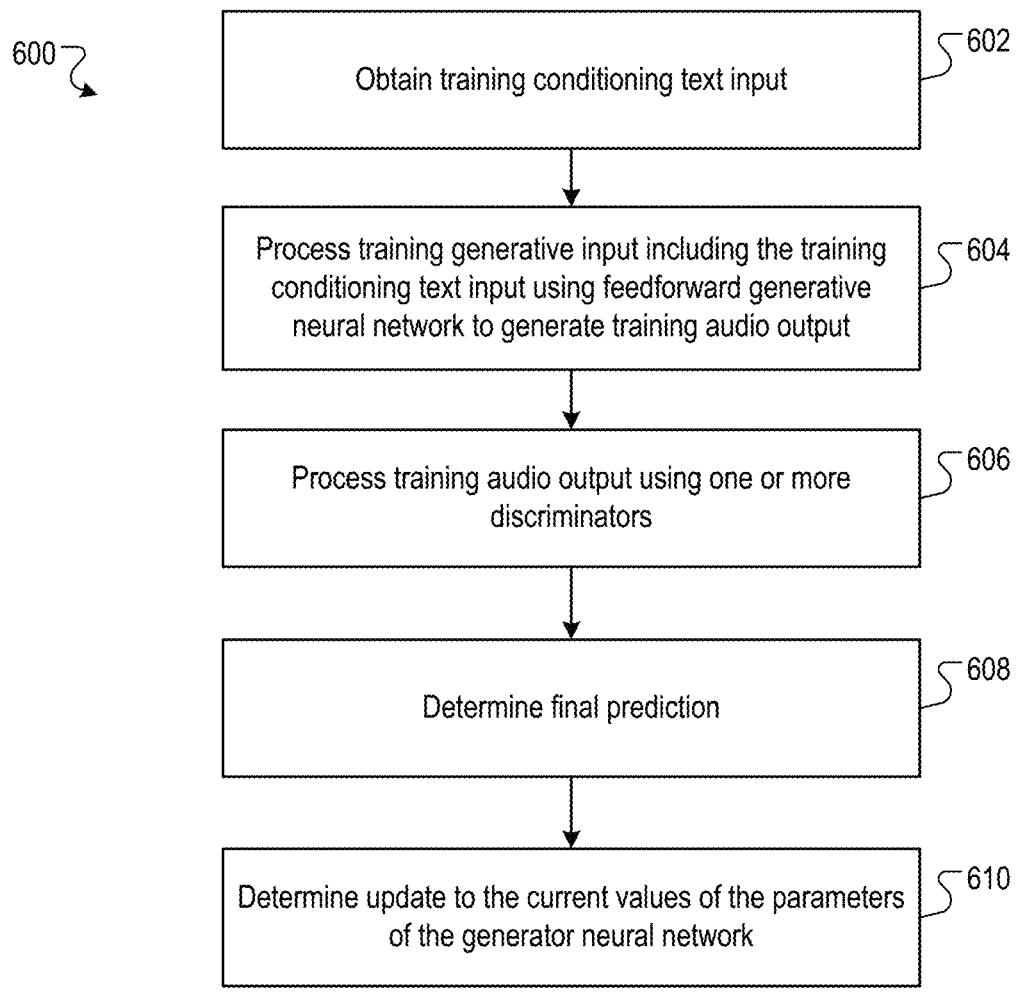
FIG. 6 is a flow diagram of an example process for training a generative neural network.

FIG. 6 is a flow diagram of an example process 600 for training a generative neural network. For convenience, the process 600 will be described as being performed by a system of one or more computers located in one or more locations. For example, a training system, e.g., the training system 110B depicted in FIG. 1B, appropriately programmed in accordance with this specification, can perform the process 600.

The system obtains a training conditioning text input (step 602).

The system processes a training generative input that includes the training conditioning text input using the feed-forward generative neural network in accordance with current values of the generative parameters to generate a training audio output (step 604). In particular, the system processes the training generative input using an alignment neural network to generate an aligned conditioning sequence that includes a respective feature representation at each of a plurality of first time steps and processes the aligned conditioning sequence using a generator neural network to generate the training audio output.

The system processes the training audio output using each of one or more discriminators, wherein each discriminator predicts whether the training audio output is a real audio example or a synthetic audio example (step 606).

The system determines a final prediction using the respective predictions of the one or more discriminators (step 608).

The system determines an update to the current values of the generative parameters to increase a first error in the final prediction (step 610). The system can also determine other updates based on other objectives, e.g., a spectrogram loss, a length loss, or both, as described above.

Figure 7:
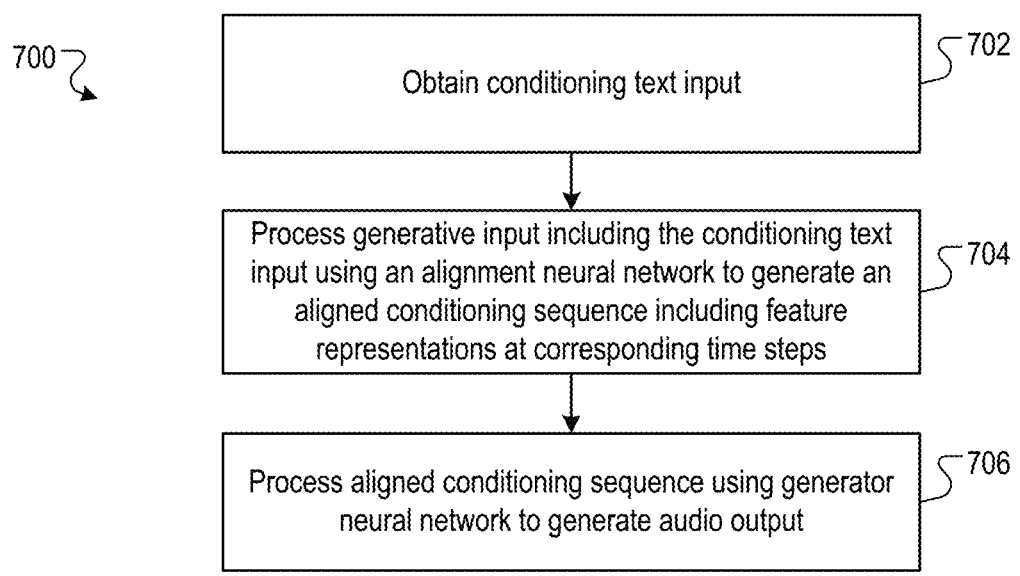
FIG. 7 is a flow diagram of an example process for generating audio output.

FIG. 7 is a flow diagram of an example process 700 for generating an audio output. For convenience, the process 700 will be described as being performed by a system of one or more computers located in one or more locations. For example, an inference system, e.g., the inference system 110A depicted in FIG. 1A, appropriately programmed in accordance with this specification, can perform the process 700.

The system obtains a conditioning text input (step 702).

The system processes a generative input that includes the conditioning input using the alignment neural network to generate an aligned conditioning sequence that includes a respective feature representation at each of a plurality of first time steps (step 704). In particular, the conditioning sequence is referred to as an "aligned" sequence because each time step in the aligned sequence corresponds to a fixed length of time in the audio output that will be generated by the generator neural network.

The system processes the aligned conditioning sequence using the generator neural network to generate the audio output (step 706).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of training a feedforward generative neural network having a plurality of generative parameters and configured to generate output audio examples using conditioning text inputs,
    wherein each conditioning text input comprises a respective linguistic feature representation at each of a plurality of input time steps,
    wherein the feedforward generative neural network is configured to receive a generative input comprising a conditioning text input and to process the generative input to generate an audio output that comprises respective audio samples at each of a plurality of output time steps, and wherein the method comprises:
obtaining a training conditioning text input;
processing a training generative input comprising the training conditioning text input using the feedforward generative neural network in accordance with current values of the generative parameters to generate a training audio output having a plurality of non-overlapping time windows, the processing comprising:
processing the training generative input using an alignment neural network to generate an aligned conditioning sequence comprising a respective feature representation at each of a plurality of first time steps, wherein each of the plurality of first time steps corresponds to a different one of the plurality of non-overlapping time windows in the training audio output, and wherein processing the training generative input using an alignment neural network comprises:
processing the training generative input using a first subnetwork to generate an intermediate sequence having a respective intermediate element at each of a plurality of intermediate time steps;
processing the intermediate sequence using a second subnetwork to generate, for each intermediate element, a length prediction characterizing a predicted length of time for the intermediate element, wherein the predicted length of time represents a time duration that speech represented by the intermediate element will be spoken in the training audio output; and
processing the respective length predictions for the intermediate elements to generate the aligned conditioning sequence by non-uniformly interpolating the intermediate sequence using the respective length predictions of the intermediate elements to generate the feature representations at each of the plurality of first time steps in the aligned conditioning sequence, wherein non-uniformly interpolating the intermediate sequence comprises, for each first time step:
determining a respective weight value for each of the intermediate elements from the respective length predictions for the intermediate elements that each represent the time duration that speech represented by the intermediate element will be spoken in the training audio output, and
combining the intermediate elements using the respective weight values for the intermediate elements to generate the feature representation at the first time step; and
processing the aligned conditioning sequence using a generator neural network to generate the training audio output;
processing the training audio output using each of one or more discriminators, wherein each discriminator predicts whether the training audio output is a real audio example or a synthetic audio example;
determining a final prediction using the respective predictions of the one or more discriminators; and determining an update to the current values of the generative parameters to increase a first error in the final prediction.

2. The method of claim 1, wherein:
each discriminator has a plurality of respective discriminative parameters,
each discriminator processes the training audio output in accordance with current values of the respective discriminative parameters, and
the method further comprises determining an update to the current values of the discriminative parameters to decrease the first error in the prediction.

3. The method of claim 1, wherein:
each discriminator has a plurality of respective discriminative parameters; and
the training further comprises:
obtaining a real audio example;
processing the real audio example using each of the one or more discriminators, wherein each discriminator predicts whether the real audio example is a real audio example or a synthetic audio example;
determining a second final prediction using the respective predictions of the one or more discriminators; and
determining an update to the current values of the discriminative parameters to decrease a second error in the second final prediction.

4. The method of claim 1, wherein the generator neural network comprises a sequence of groups of one or more convolutional neural network layers, wherein each group includes one or more dilated convolutional layers.

5. The method of claim 1, wherein the one or more discriminators comprises one or more unconditional discriminators, wherein each unconditional discriminator processes a respective subset of the training audio output but not the training conditioning text input to predict whether the training audio output is a real audio example or a synthetic audio example.

6. The method of claim 5, wherein each unconditional discriminator comprises a discriminator neural network that comprises a sequence of groups of one or more convolutional neural network layers, wherein each group includes one or more dilated convolutional layers.

7. The method of claim 5, wherein:
each respective subset of the training audio output is a proper subset of the training audio output, and
at least two of the unconditional discriminators process different proper subsets of the training audio output.

8. The method of claim 7, wherein processing a respective proper subset of the training audio output comprises, for each unconditional discriminator:
taking a random sample of the training audio output, wherein the random sample comprises a plurality of consecutive audio samples, wherein a size of the random sample for a given discriminator is predetermined; and
processing the random sample of the training audio output.

9. The method of claim 8, wherein processing the random sample of the training audio output comprises, for each unconditional discriminator, downsampling the random sample of the training audio output to generate a downsampled representation, wherein each unconditional discriminator downsamples the random sample by a predetermined downsampling factor.

10. The method of claim 9, wherein:
the respective predetermined downsampling factor for each unconditional discriminator corresponds to the size of the random sample for the unconditional discriminator; and
each downsampled representation has a common dimensionality for all of the unconditional discriminators.

11. The method of claim 9, wherein downsampling the random sample of the training audio output comprises processing the random sample of the training audio output using a strided convolutional neural network layer.

12. The method of claim 5, wherein each unconditional discriminator further processes an embedding of a speaker identity of the training audio output.

13. The method of claim 1, wherein the generative input further comprises an identification of a class to which the audio output should belong.

14. The method of claim 1, wherein the aligned conditioning sequence has a frequency that is smaller than a frequency of the training audio output.

15. The method of claim 1, wherein the first subnetwork comprises a plurality of dilated convolutional neural network layers.

16. The method of claim 1, wherein the second subnetwork comprises a pointwise multi-layer perceptron.

17. The method of claim 1, wherein processing the respective length predictions to generate the aligned conditioning sequence comprises:
determining a cumulative length prediction using the respective length predictions of the plurality of intermediate elements; and
determining a number of first time steps using the cumulative length prediction, wherein the first time steps have a predetermined frequency.

18. The method of claim 1, wherein non-uniformly interpolating the intermediate sequence further comprises:
determining a predicted position in time for each intermediate element from the respective length predictions.

19. The method of claim 18, wherein determining a predicted position in time for each intermediate element comprises:
computing, for each intermediate element, a cumulative sum of length predictions $e_n = \Sigma_{m=1}^{n} l_m$, and
computing, for each intermediate element, the prediction position in time $c_n = e_n - \frac{1}{2} l_n$.

20. The method of claim 18, wherein determining a respective weight value for an intermediate element n and a first time step t comprises computing:

$$w_t^n = \frac{\exp(-\sigma^{-2}(t - c_n)^2)}{\sum_{m=1}^{N} \exp(-\sigma^{-2}(t - c_m)^2)},$$

where N is the number of intermediate elements, $c_n$ is the predicted position in time for the $n^{th}$ intermediate element, and $\sigma^2$ is a predetermined temperature parameter.

21. The method of claim 1, wherein determining an update to the current values of the generative parameters comprises determining an update according to an aligner length loss that characterizes an error in the length of the training audio output.

22. The method of claim 21, wherein the aligner length loss is $$\mathcal{L}_{length} = \left(L - \sum_{n=1}^{N} l_n\right)^2,$$

where L is a length of a ground-truth audio output corresponding to the training conditioning text input, N is a number of intermediate elements, and $l_n$ is the length prediction of the $n^{th}$ intermediate element.

23. The method of claim 1, wherein processing the training audio output using each of one or more discriminators comprises processing the training audio output using a spectrogram discriminator, comprising:
processing the training audio output to generate a spectrogram of the training audio output;
processing the spectrogram of the training audio output using the spectrogram discriminator to predict whether the training audio output is a real audio example or a synthetic audio example.

24. The method of claim 23, wherein the spectrogram discriminator further processes an embedding of a speaker identity of the training audio output.

25. The method of claim 23, wherein the spectrogram discriminator comprises one or more convolutional neural network layers.

26. The method of claim 1, wherein determining an update to the current values of the generative parameters comprises determining an update according to a spectrogram prediction loss, comprising:
processing the training audio output to generate a predicted spectrogram of the training audio output;
processing a ground-truth audio output corresponding to the training conditioning text input to generate a ground-truth spectrogram of the ground-truth audio output; and
determining a spectrogram prediction loss characterizing a difference between the predicted spectrogram and the ground-truth spectrogram.

27. The method of claim 26, wherein the spectrogram prediction loss is $$\mathcal{L}_{pred} = \frac{1}{F} \sum_{t=1}^{T} \sum_{f=1}^{F} |S_{gt}[t, f] - S_{gen}[t, f]|,$$

where $S_{gt}$ is the ground-truth spectrogram, $S_{gen}$ is the predicted spectrogram, T is a number of time points in the spectrograms, and F is a number of frequency bins in the spectrograms.

28. The method of claim 26, wherein the spectrogram prediction loss is determined using dynamic time warping, comprising determining an alignment path p between the ground-truth spectrogram and the predicted spectrogram $$p = \langle (p_{gen,1}, p_{gt,1}), \ldots, (p_{gen,K_p}, p_{gt,K_p}) \rangle,$$

wherein $K_p$ is a number of elements of the alignment path p; $p_{gen}$ is a subpath in a time dimension of the predicted spectrogram; $p_{gt}$ is a subpath in a time dimension of the ground-truth spectrogram; and $p_{gen,1} = P_{gt,1} = 1$, and
wherein determining the alignment path p comprises, at each step $k \in [1, K_p - 1]$, determining the next element of the alignment path according to one of the following actions:
advancing both $S_{gt}$ and $S_{gen}$ so that $p_{gen,k+1} = p_{gen,k} + 1$, $p_{gt,k+1} = p_{gt,k} + 1$, advancing only $S_{gt}$ so that $p_{gen,k+1}=p_{gen,k}$, $p_{gt,k+1}=p_{gt,k}+1$, or advancing only $S_{gen}$ so that $p_{gen,k+1}=p_{gen,k}+1$, $p_{gt,k+1}=p_{gt,k}$.

29. The method of claim 28, wherein determining the alignment path p comprises, for each step $k \in [1, K_p-1]$:

determining, for each action, a step cost, comprising:
determining a distance between $S_{gen}[p_{gen,k}]$ and $S_{gt}[p_{gt,k}]$; and
determining a warp penalty w if $S_{gt}$ and $S_{gen}$ are not both advanced.

30. The method of claim 29, wherein determining the alignment path p comprises:

determining, for each of a plurality of possible alignment paths, a total path cost by combining the step cost of each step in the possible alignment path; and
selecting the alignment path p that minimizes the total path cost.

31. The method of claim 30, wherein the total path cost for a possible alignment path is $$c_p = \sum_{k=1}^{K_p} \left( w \cdot \delta_k + \frac{1}{F}\sum_{f=1}^{F} |S_{gen}[p_{gen,k}, f] - S_{gt}[p_{gt,k}, f]| \right),$$

where $\delta_k$ is an indicator that is 1 for steps for which $S_{gt}$ and $S_{gen}$ are not both advanced; F is a number of frequency bins in the spectrograms; and $K_p$ is a number of elements of the possible alignment path, $T \leq K_p \leq 2T-1$, where T is a number of time points in the spectrograms.

32. The method of claim 31, wherein the spectrogram prediction loss is $$\mathcal{L}'_{pred} = \min_{p \in \mathcal{P}} c_p,$$

where P is a set of possible alignment paths.

33. The method of claim 31, wherein the spectrogram prediction loss is $$\mathcal{L}''_{pred} = -\tau \cdot \log \Sigma_{p \in \mathcal{P}} \exp\left(-\frac{c_p}{\tau}\right),$$

where P is a set of possible alignment paths, and $\tau$ is a temperature parameter.

34. A system comprising one or more computers and one or more storage devices storing instructions that when executed by the one or more computers cause the one or more computers to perform operations for training a feedforward generative neural network having a plurality of generative parameters and configured to generate output audio examples using conditioning text inputs, wherein each conditioning text input comprises a respective linguistic feature representation at each of a plurality of input time steps, wherein the feedforward generative neural network is configured to receive a generative input comprising a conditioning text input and to process the generative input to generate an audio output that comprises respective audio samples at each of a plurality of output time steps, and wherein the operations comprise:
obtaining a training conditioning text input;
processing a training generative input comprising the training conditioning text input using the feedforward generative neural network in accordance with current values of the generative parameters to generate a training audio output having a plurality of non-overlapping time windows, the processing comprising:
processing the training generative input using an alignment neural network to generate an aligned conditioning sequence comprising a respective feature representation at each of a plurality of first time steps, wherein each of the plurality of first time steps corresponds to a different one of the plurality of non-overlapping time windows in the training audio output, and wherein processing the training generative input using an alignment neural network comprises:
processing the training generative input using a first subnetwork to generate an intermediate sequence having a respective intermediate element at each of a plurality of intermediate time steps;
processing the intermediate sequence using a second subnetwork to generate, for each intermediate element, a length prediction characterizing a predicted length of time for the intermediate element, wherein the predicted length of time represents a time duration that speech represented by the intermediate element will be spoken in the training audio output; and
processing the respective length predictions for the intermediate elements to generate the aligned conditioning sequence by non-uniformly interpolating the intermediate sequence using the respective length predictions of the intermediate elements to generate the feature representations at each of the plurality of first time steps in the aligned conditioning sequence, wherein non-uniformly interpolating the intermediate sequence comprises, for each first time step:
determining a respective weight value for each of the intermediate elements from the respective length predictions for the intermediate elements that each represents the time duration that the speech represented by the intermediate element will be spoken in the training audio output, and
combining the intermediate elements using the respective weight values for the intermediate elements to generate the feature representation at the first time step; and
processing the aligned conditioning sequence using a generator neural network to generate the training audio output;
processing the training audio output using each of one or more discriminators, wherein each discriminator predicts whether the training audio output is a real audio example or a synthetic audio example;
determining a final prediction using the respective predictions of the one or more discriminators; and
determining an update to the current values of the generative parameters to increase a first error in the final prediction.

35. One or more non-transitory computer-readable storage media storing instructions that when executed by the one or more computers cause the one or more computers to perform operations for training a feedforward generative neural network having a plurality of generative parameters and configured to generate output audio examples using conditioning text inputs,
  wherein each conditioning text input comprises a respective linguistic feature representation at each of a plurality of input time steps,
  wherein the feedforward generative neural network is configured to receive a generative input comprising a conditioning text input and to process the generative input to generate an audio output that comprises respective audio samples at each of a plurality of output time steps, and
  wherein the operations comprise:
    obtaining a training conditioning text input;
    processing a training generative input comprising the training conditioning text input using the feedforward generative neural network in accordance with current values of the generative parameters to generate a training audio output having a plurality of non-overlapping time windows, the processing comprising:
      processing the training generative input using an alignment neural network to generate an aligned conditioning sequence comprising a respective feature representation at each of a plurality of first time steps, wherein each of the plurality of first time steps corresponds to a different one of the plurality of non-overlapping time windows in the training audio output, and wherein processing the training generative input using an alignment neural network comprises:
        processing the training generative input using a first subnetwork to generate an intermediate sequence having a respective intermediate element at each of a plurality of intermediate time steps;
        processing the intermediate sequence using a second subnetwork to generate, for each intermediate element, a length prediction characterizing a predicted length of time for the intermediate element, wherein the predicted length of time represents a time duration that speech represented by the intermediate element will be spoken in the training audio output; and
        processing the respective length predictions for the intermediate elements to generate the aligned conditioning sequence by non-uniformly interpolating the intermediate sequence using the respective length predictions of the intermediate elements to generate the feature representations at each of the plurality of first time steps in the aligned conditioning sequence, wherein non-uniformly interpolating the intermediate sequence comprises, for each first time step:
          determining a respective weight value for each of the intermediate elements from the respective length predictions for the intermediate elements that each represent a time duration that speech represented by the intermediate element will be spoken in the training audio output, and
          combining the intermediate elements using the respective weight values for the intermediate elements to generate the feature representation at the first time step; and
      processing the aligned conditioning sequence using a generator neural network to generate the training audio output;
    processing the training audio output using each of one or more discriminators, wherein each discriminator predicts whether the training audio output is a real audio example or a synthetic audio example;
    determining a final prediction using the respective predictions of the one or more discriminators; and
    determining an update to the current values of the generative parameters to increase a first error in the final prediction.

* * * * *

UNITED STATES PATENT AND TRADEMARK OFFICE
CERTIFICATE OF CORRECTION

| | | |
|---|---|---|
| PATENT NO. | : 12,288,547 B2 | Page 1 of 1 |
| APPLICATION NO. | : 17/339834 | |
| DATED | : April 29, 2025 | |
| INVENTOR(S) | : Donahue et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this
Sixteenth Day of December, 2025

John A. Squires
*Director of the United States Patent and Trademark Office*